(12) United States Patent
Tsuji et al.

(10) Patent No.: US 8,649,057 B2
(45) Date of Patent: Feb. 11, 2014

(54) OPERATION APPARATUS, IMAGE FORMING APPARATUS, DISPLAY CONTROL METHOD, AND MEDIUM FOR RECORDING PROGRAM

(75) Inventors: Takuya Tsuji, Osaka (JP); Yoshitaka Matsuki, Osaka (JP); Shinya Ogawa, Osaka (JP); Masayuki Yamashirodani, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 9 days.

(21) Appl. No.: 13/557,913

(22) Filed: Jul. 25, 2012

(65) Prior Publication Data

US 2013/0027719 A1    Jan. 31, 2013

(30) Foreign Application Priority Data

Jul. 27, 2011 (JP) ................................. 2011-164690

(51) Int. Cl.
*G06F 15/00* (2006.01)
*G06F 3/041* (2006.01)

(52) U.S. Cl.
USPC .......... 358/1.9; 358/1.13; 358/1.14; 358/1.15

(58) Field of Classification Search
USPC .............. 358/1.9, 1.13, 1.14, 1.15, 1.16, 437; 345/173
See application file for complete search history.

(56) References Cited

U.S. PATENT DOCUMENTS

| 5,950,045 | A | 9/1999 | Nomura et al. |
| 2001/0004424 | A1 | 6/2001 | Mutoh et al. |
| 2008/0278766 | A1* | 11/2008 | Imine ..................... 358/3.28 |
| 2009/0024958 | A1* | 1/2009 | Itou ......................... 715/805 |
| 2010/0134822 | A1* | 6/2010 | Kimura et al. .......... 358/1.14 |

FOREIGN PATENT DOCUMENTS

| JP | 7-203094 A | 8/1995 |
| JP | 2001-169039 A | 6/2001 |
| JP | 2004-282401 A | 10/2004 |
| JP | 2009-262345 A | 11/2009 |

OTHER PUBLICATIONS

Communication from a foreign (European) patent office for a counterpart foreign application dated May 22, 2013.

* cited by examiner

*Primary Examiner* — Allen H Nguyen

(57) ABSTRACT

The operation apparatus according to the present disclosure includes a touch panel, a determination unit, a shrinkage rate calculating unit, a window shrinking unit, and a multi window display unit. The shrinkage rate calculating unit that calculates, in a case in which the determination unit determines that an input operation on the plurality of setting item keys is detected within a predetermined time period, a shrinkage rate allowing equal allocation of space for a predetermined number of setting condition input windows in a display region based on the setting item number, and a size of the display region in a case of displaying only one setting condition input window on the touch panel. The multi window display unit that displays in the display region the predetermined number of setting condition input windows that are shrunk by the window shrinking unit.

15 Claims, 14 Drawing Sheets

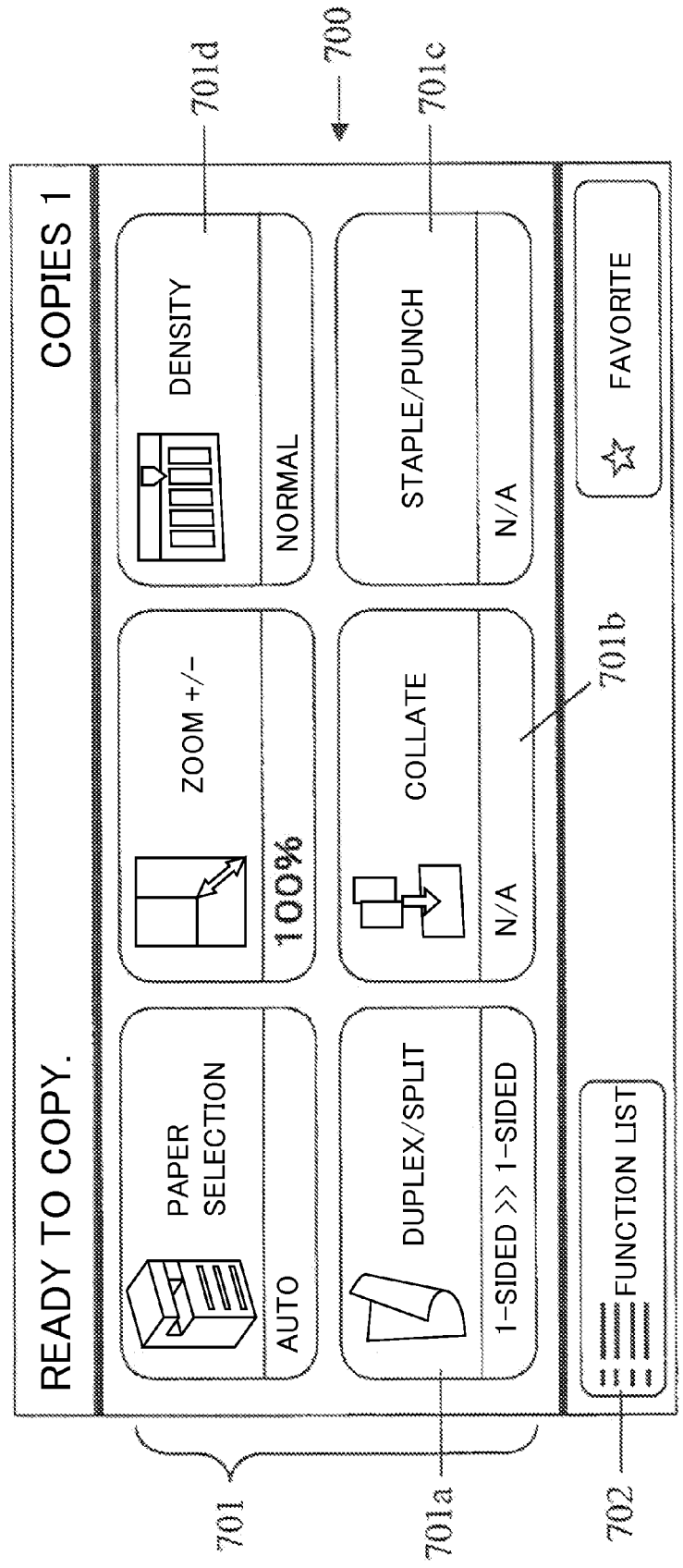

FIG. 8A

| SETTING ITEM | RANK ORDER |
|---|---|
| DUPLEX/SPLIT | 1 |
| COLLATE | 2 |
| STAPLE/PUNCH | 3 |
| DENSITY | 4 |

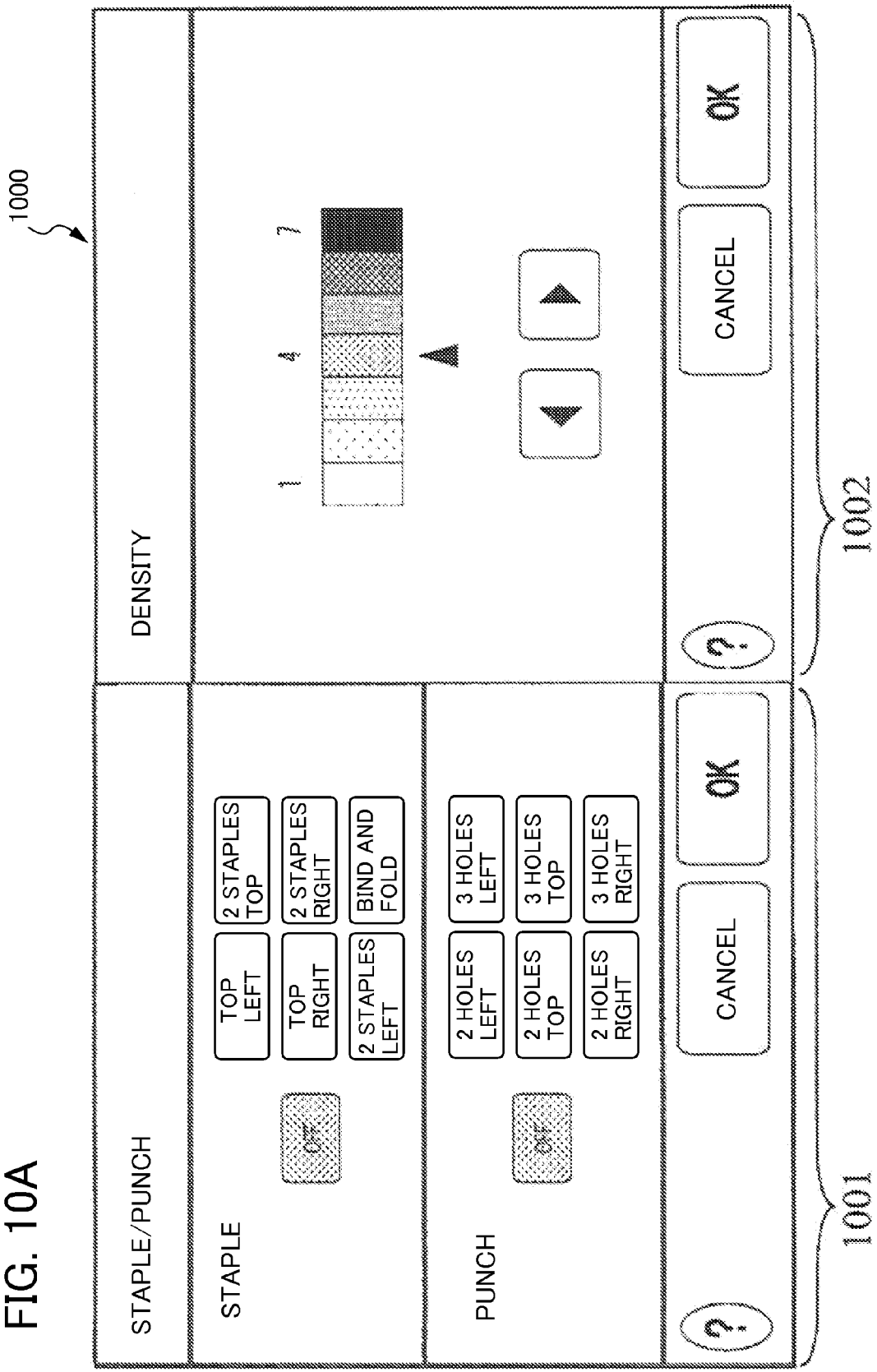

OPERATION APPARATUS, IMAGE FORMING APPARATUS, DISPLAY CONTROL METHOD, AND MEDIUM FOR RECORDING PROGRAM

INCORPORATION BY REFERENCE

This application is based on and claims the benefit of priority from Japanese Patent Application No. 2011-164690, filed on 27 Jul. 2011, the content of which is incorporated herein by reference.

BACKGROUND

The present disclosure is related to an operation apparatus, an image forming apparatus, a display control method, and a medium for recording a program.

An operation panel that displays various function items and operation conditions thereof by employing a liquid crystal display (LCD) and a cathode-ray tube (CRT) is conventionally known as an operation panel for an image forming device such as a digital color copier and facsimile.

Recently, a display device (operation apparatus) with a touch panel that displays various function items while accepting selection of the function items and condition input is widely used. The display device changes the content of a display window in response to user's input.

The display device generally has a plurality of layers of display until reaching a window in which an image forming condition is set. For example, when a user presses a display area of a function item key, the display device switches the display window to a window relating to a function item corresponding to the function item key. The user selects and inputs the image forming condition according to instructions on the window thus switched. After lapse of a certain period of time since the image forming condition is set by the user, or after lapse of a predetermined period of time without setting of the image forming condition by the user, the image forming apparatus resets the image forming condition and changes the display window back to the initial window.

The display device is configured, in a state of displaying a window in which conditions for a certain function item can be input, not to display information other than details of the selected function item. As a result, for setting and confirmation of conditions for other functions, an operation of changing the display window on the display device to the initial window is required from the user each time.

For example, if the user presses a START key immediately after inputting conditions for a certain function item, without performing an operation for returning to the initial window, the certain function is performed but incorrect setting may be overlooked. In such a case, printing paper is wasted.

In addition, the display device resets the image forming condition after lapse of a predetermined period of time even if the user is in the middle of inputting setting of the image forming condition. In such a case, the user must repeat setting of the image forming condition, leading to inconvenience.

As a technique for solving such problems, a display control means of, in a case in which a function item key pressed (selected) on a touch panel is determined to be an upper layer key in a first display block changing, display contents in second and third display blocks while maintaining a display content of the first display block, is disclosed (Related Art 1). Furthermore, in the display control means of, in a case in which the function item key that is pressed is determined to be an intermediate layer key in the second display block changing, the display content of the third display block while maintaining the display content of the first and second display blocks. According to Related Art 1, a user can check a plurality of image forming conditions in parallel and can check other copy conditions while inputting a certain copy condition, thereby preventing incorrect setting.

In addition, a function display method is disclosed that uses a display window to display information that relates respectively to a plurality of types of functions that can be selected as a function for execution by the apparatus (Related Art 2). In this function display method, the display area allocated separately to each function in the display screen is varied in response to whether or not the function is selected, and when selection is possible of a part of the functions that are not selected as a result of the functions that are currently selected, a message to that effect is displayed in the display screen. Related Art 2 allows a user to simply comprehend the selection state of each function from the position, shape or surface area of the display area for each function on the display screen when selecting a function for execution on the apparatus, and may enable the user to simply comprehend whether or not a part of the functions of those respective functions can be selected from the display content on the display screen.

In addition, an operation unit display device having a display unit that divides an upper-layer default setting window in advance and displays: a plurality of function groups respectively arranged in a plurality of compartments; titles provided for the plurality of function groups that function as layer selection buttons; and detailed settings windows that correspond respectively to the plurality of function groups, is disclosed (Related Art 3). The operation unit display device is provided with an operation unit control means that displays the detailed settings windows in response to selection of the title that functions as the layer selection button. According to Related Art 3, a display area required for layer selection buttons can be reduced and the function selection buttons and the layer selections buttons, which are also the titles, can be easily distinguished, thereby efficiently using the display region.

In addition, an image forming apparatus that is configured to include: a plurality of function keys used for setting various functions relating to image formation; and a display unit that displays various information including the function keys on a display window, is disclosed (Related Art 4). The image forming apparatus includes: a multiple input unit that allows simultaneous input of operation information relating to one or plurality of function keys that are provided in the display unit and displayed on the display window; a function setting unit that collectively sets multiple functions according to the operation information thus input, in a case in which the operation information relating to the plurality of function keys is simultaneously input via the multiple input unit; and an engine unit that performs an image forming process relating to the multiple functions that are collectively set by the function setting unit.

According to Related Art 4, a user wishing to use multiple functions is only required to simultaneously operate on multiple functions desired among the plurality of function keys displayed on the display window of the display unit, in order to collectively set multiple functions according to the operation information thus input and to perform an image forming process relating to the multiple functions thus collectively set. As a result, the user can set the multiple functions without a complex operation, for example successively operating on desired function keys, and with as small number of steps as possible, and operability and convenience of the apparatus can be dramatically improved.

However, in Related Arts 1 to 3, although the user can input setting conditions for a predetermined function while easily checking a selection status of each function, windows that the user doesn't need to check are continuously displayed, wasting the display area of a screen.

In addition, although Related Art 4 allows simultaneous and continuous input of multiple function keys, detailed setting conditions cannot be input for each function. Related Art 4 is therefore not suitable for a user wishing to input detailed setting conditions.

SUMMARY

The operation apparatus according to the present disclosure includes a touch panel, a determination unit, a shrinkage rate calculating unit, a window shrinking unit, and a multi window display unit.

The touch panel is configured to be able to display a setting item window displaying a plurality of setting item keys and a setting condition input window accepting input of a setting condition for a setting item corresponding to each of the plurality of setting item keys and detect an input operation to the plurality of setting item keys.

The determination unit determines whether an input operation on the plurality of setting item keys is detected within a predetermined time period by the touch panel.

The shrinkage rate calculating unit that calculates, in a case in which the determination unit determines that an input operation on the plurality of setting item keys is detected within a predetermined time period, a shrinkage rate allowing equal allocation of space for a predetermined number, which is at least a setting item number, which is the number of setting item keys on which the input operation is detected, of setting condition input windows in a display region based on the setting item number, and a size of the display region in a case of displaying only one setting condition input window on the touch panel.

The window shrinking unit shrinks a predetermined number of setting condition input windows among the setting condition input windows for accepting an input of a setting condition for the setting item corresponding to the setting item keys on which the input operation is detected, based on the shrinkage rate calculated by the shrinkage rate calculating unit.

The multi window display unit that displays in the display region the predetermined number of setting condition input windows that are shrunk by the window shrinking unit.

The operation apparatus according to the present disclosure includes a touch panel, a determination unit, a shrinkage rate calculating unit, a window shrinking unit, and a multi window display unit.

The touch panel is configured to be able to display a setting item window displaying a plurality of setting item keys and a setting condition input window accepting input of a setting condition for a setting item corresponding to each of the plurality of setting item keys and detect an input operation to the plurality of setting item keys.

The determination unit determines whether an input operation on the plurality of setting item keys is detected within a predetermined time period by the touch panel.

The shrinkage rate calculating unit that calculates, in a case in which the determination unit determines that an input operation on the plurality of setting item keys is detected within a predetermined time period, a shrinkage rate allowing equal allocation of space for a predetermined number, which is at least a setting item number, which is the number of setting item keys on which the input operation is detected, of setting condition input windows in a display region based on the setting item number, and a size of the display region in a case of displaying only one setting condition input window on the touch panel.

The window shrinking unit shrinks a predetermined number of setting condition input windows among the setting condition input windows for accepting an input of a setting condition for the setting item corresponding to the setting item keys on which the input operation is detected, based on the shrinkage rate calculated by the shrinkage rate calculating unit.

The multi window display unit that displays in the display region the predetermined number of setting condition input windows that are shrunk by the window shrinking unit.

The image forming apparatus according to the present disclosure includes an operation apparatus.

The operation apparatus includes a touch panel, a determination unit, a shrinkage rate calculating unit, a window shrinking unit, and a multi window display unit.

The touch panel is configured to be able to display a setting item window displaying a plurality of setting item keys and a setting condition input window accepting input of a setting condition for a setting item corresponding to each of the plurality of setting item keys and detect an input operation to the plurality of setting item keys.

The determination unit determines whether an input operation on the plurality of setting item keys is detected within a predetermined time period by the touch panel.

The shrinkage rate calculating unit that calculates, in a case in which the determination unit determines that an input operation on the plurality of setting item keys is detected within a predetermined time period, a shrinkage rate allowing equal allocation of space for a predetermined number, which is at least a setting item number, which is the number of setting item keys on which the input operation is detected, of setting condition input windows in a display region based on the setting item number, and a size of the display region in a case of displaying only one setting condition input window on the touch panel.

The window shrinking unit shrinks a predetermined number of setting condition input windows among the setting condition input windows for accepting an input of a setting condition for the setting item corresponding to the setting item keys on which the input operation is detected, based on the shrinkage rate calculated by the shrinkage rate calculating unit.

The display control method according to the present disclosure is a display control method for an operation apparatus including a touch panel that can display a setting item window displaying a plurality of setting item keys and a setting condition input window accepting input of a setting condition for a setting item corresponding to each of the plurality of setting item keys and detect an input operation to the plurality of setting item keys. The display control method includes a determination step, a shrinkage rate calculating step, a window shrinking step, and a multi window displaying step.

In the determination step, the operation apparatus determines whether an input operation to the plurality of setting item keys is detected within a predetermined time period.

In the shrinkage rate calculating step, the operation apparatus calculates, in a case in which it is determined in the determination step that an input operation on the plurality of setting item keys is detected within a predetermined time period, a shrinkage rate allowing equal allocation of space for a predetermined number, which is at least the number of setting item keys, of setting condition input windows in the display region based on the number of setting items, which is the number of setting item keys on which the input operation is detected, and a size of a display region in a case of displaying only one setting condition input window on the touch panel.

In the window shrinking step, the operation apparatus shrinks a predetermined number of the setting condition input windows, which rank high in order of acceptance of the input operation on the corresponding setting item keys, among the setting condition input windows accepting the input of a setting condition for the setting item corresponding to the setting item keys on which the input operation is detected, based on the shrinkage rate calculated in the shrinkage rate calculating step.

In the multi window displaying step, the operation apparatus displays in the display region in an arrangement corresponding to the order, the predetermined number of setting condition input windows that are shrunk in the window shrinking step.

The storage medium according to the present disclosure is a computer-readable storage medium that stores a program that causes a computer to execute the display control method.

BRIEF DESCRIPTION OF THE DRAWINGS

FIG. 7A is a diagram illustrating an example of a setting item window, which is an initial window displayed on a touch panel according to the embodiment of the present disclosure;

FIG. 8A is a diagram showing an example of a setting item pressure table according to the embodiment of the present disclosure;

FIG. 10A is a third diagram illustrating an example of the shrunk setting condition input window displayed on the touch panel according to the embodiment of the present disclosure.

DETAILED DESCRIPTION

An embodiment of an image forming apparatus provided with the operation device of the present disclosure is described hereinafter with reference to the accompanying drawings for better understanding of the present disclosure. It should be noted that the following embodiments are mere examples of implementation of the present disclosure, and in no way restrict the technical scope of the present invention. Moreover, a prefix "S" attached to numbers in flow charts unit "step".

Image Forming Apparatus and Operation Apparatus

Hereafter, an image forming apparatus provided with an operation apparatus according to an embodiment of the present disclosure will be described.

Figure 1:
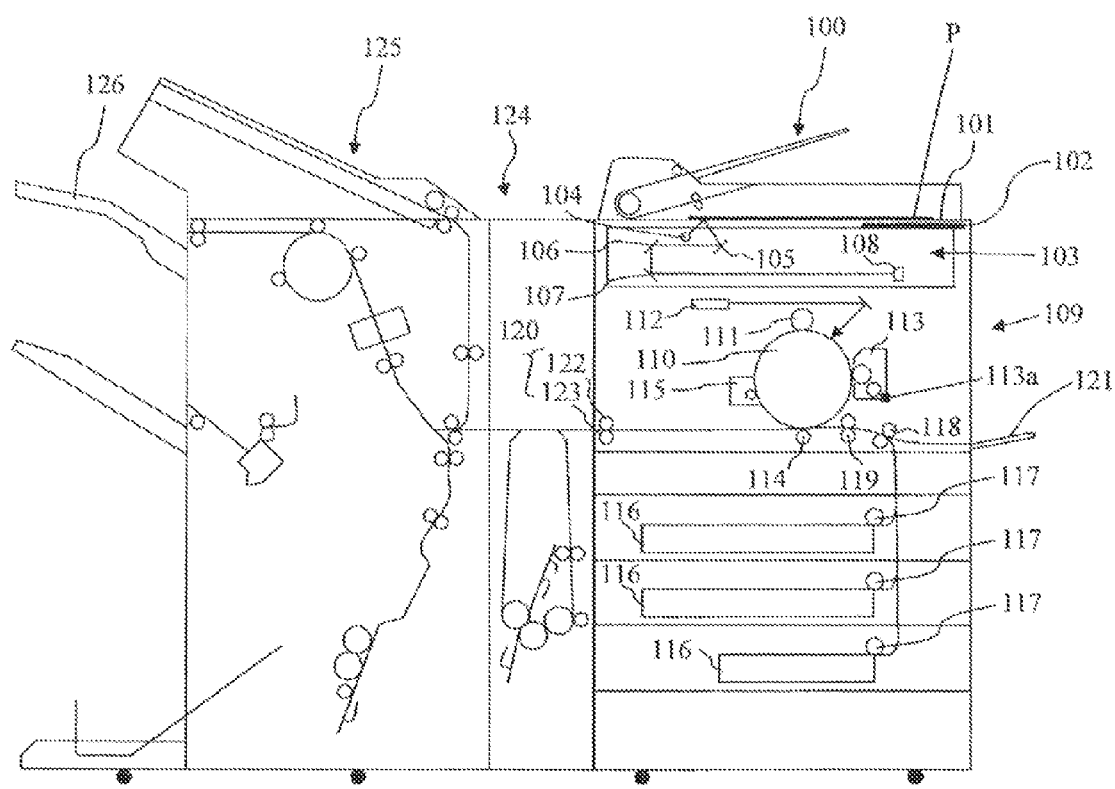
FIG. 1 is a conceptual diagram showing an overall configuration of the inside of a multifunction peripheral according to the present disclosure.

FIG. 1 is a schematic view of an image forming apparatus according to the embodiment of the present disclosure. However, the details of each component not directly related to the present disclosure are omitted. The image forming apparatus according to the present disclosure is a multifunction peripheral or the like that includes for example, a printer or a scanner unit, or a printer, a copying machine, a scanner, a FAX, or the like, which functions as an image forming apparatus including a copy function, a scanner function, a facsimile function, a printer function and the like. Operation of a multi function peripheral 100 (MFP: Multi Function Peripheral) in the case in which using copy function, for example, will be described briefly below.

First, when using the multifunction peripheral 100, the user places an original P on a platen 101 arranged at a top face of the multifunction peripheral 100, and inputs setting conditions of a copy function from an operation unit 102 (operation apparatus). On the operation unit 102, an operation window (initial window (for example, setting condition window) and the like) relating to the copy function provided by the multifunction peripheral 100 such that a plurality of setting item keys relating to the copy function can be selected. The operation unit 102 can display the setting item window (initial window) displaying a plurality of setting item keys and a setting condition input window accepting input of a setting condition for a setting item corresponding to each of the plurality of setting item keys. The operation unit 102 is configured to detect an input operation on the plurality of setting item keys and an input operation on the setting condition input window. In the operation window, function item keys for various functions are selectable displayed in tabs. A user inputs a setting condition relating to the copy function from the operation window.

After completing the input of the setting condition, the user makes the multifunction peripheral 100 start the process of the copy function by pressing a START key 205 provided in the operation unit 102.

When the multifunction peripheral 100 starts the process of copy function, an image reader 103 irradiates light from a light source 104 onto the original placed on the platen 101. Then, the light reflected from the original is guided to an imaging device 108 by mirrors 105, 106, and 107. The imaging device 108 performs photoelectric conversion of the light thus guided, and outputs as an electric signal. Then, a processing circuit (not illustrated) performs a fundamental correction process, image quality process, compression process, and the like, and generates an image data corresponding to the image formed on the surface of the original.

The image forming unit 109 is a driving unit that transfers the image data as a toner image. The above image forming unit 109 is provided with a photoreceptor drum 110. The photoreceptor drum 110 rotates in a predetermined direction at a constant speed. In the periphery of the photoreceptor drum 110, a charging device 111, an exposure unit 112, a developing device 113, a transfer device 114, a cleaning unit 115 and the like are disposed, in this order from an upstream side in a rotational direction.

The charging device 111 uniformly charges a surface of the photoreceptor drum 110. The exposure unit 112 irradiates a surface of the photoreceptor drum 110 thus charged with laser based on the image data, thereby forming an electro-static latent image. The developing device 113 deposits toner on the electrostatic latent image being fed, thereby forming a toner image on the surface of the photoreceptor drum 110. The transfer device 114 transfers the toner image thus formed to a recording medium (for example, a sheet). The cleaning unit 115 removes excessive toner remaining on the surface of the photoreceptor drum 110. This series of processes is performed by rotation of the photoreceptor drum 110.

The sheet is fed from a plurality of paper feeding cassettes 116 provided in the multifunction peripheral 100. The sheet to be fed is pulled out from any one of the paper feeding cassettes 116 to a paper path by a pickup roller 117. In each of the paper feeding cassettes 116, sheets of different types are stored. The sheets are fed based on setting regarding the output conditions.

The sheet being pulled out to the paper path is fed into between the photoreceptor drum 110 and the transfer device 114 by a feeding roller 118 and a resist roller 119. The sheet thus fed is, after transfer of the toner image thereto by the transfer device 114, further fed to the fusing device 120. The sheet fed by the feeding roller 118 may also be fed from a manual feeding tray 121 provided in the multifunction peripheral 100.

When the sheet to which the toner image is transferred passes between a heating roller 122 and a pressurizing roller 123 provided in the fusing device 120, heat and pressure are applied to the toner image, thereby fusing the toner image (visible image) onto the sheet. Heat quantity of the heating roller 122 is optimized according to types of sheets, in order to appropriately realize the fusing. The image formation is completed with fusing of the toner image onto the sheet. The sheet onto which the toner image (visible image) is fused is fed to an ejected paper tray 124 via the fusing device 120.

By the above described steps, the multifunction peripheral 100 provides the copy function to a user.

Figure 2:
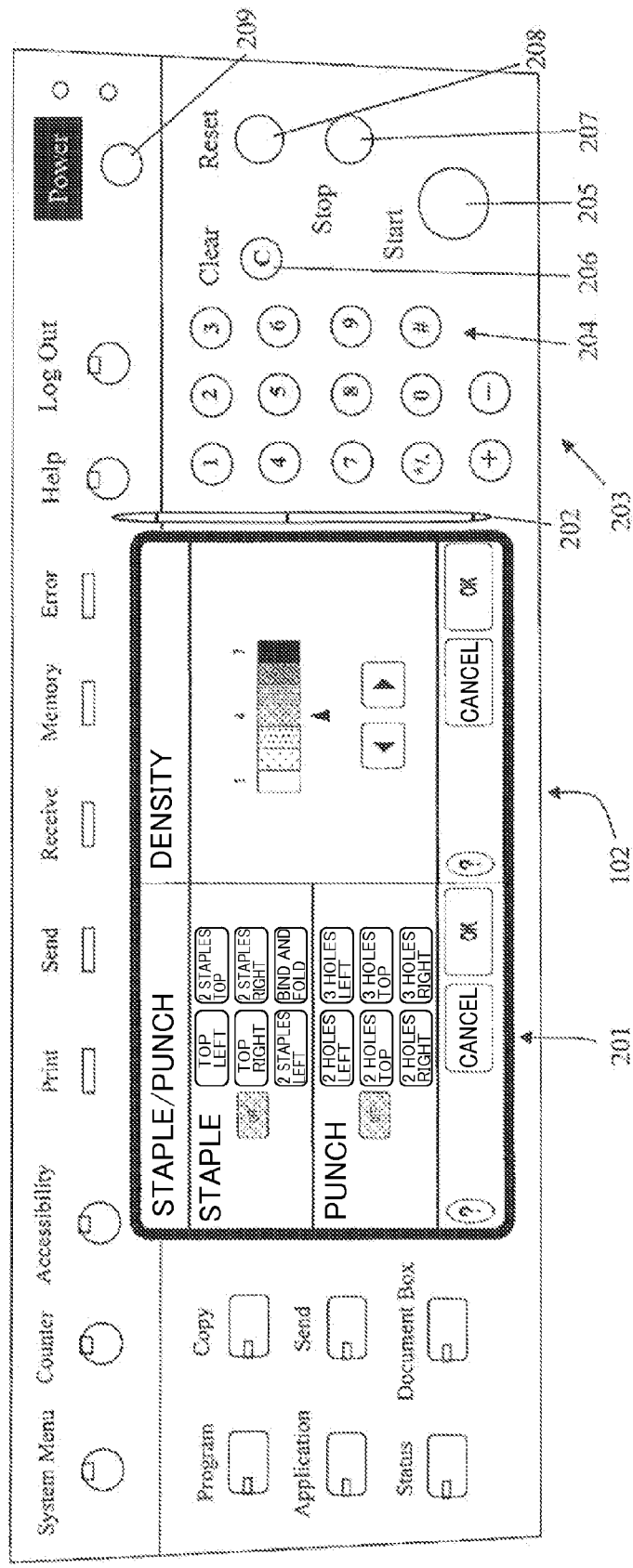
FIG. 2 is a conceptual diagram showing an overall configuration of an operation unit according to the present disclosure.

FIG. 2 is a conceptual diagram showing an overall configuration of the operation unit according to the embodiment of the present disclosure. A user inputs setting conditions or the like and confirms the setting conditions being input in relation to image formation as described above by use of the operation unit 102. When the setting conditions are input, the touch panel 201 (operation panel) provided in the operation unit 102, a stylus pen 202, and the operation key 203 are used.

The touch panel 201 is provided with both a function of inputting the setting conditions (touch sensor 201*b*) and a function of displaying the setting conditions (display unit 201*a*). In other words, by pressing an item key in a window displayed on the touch panel 201, a setting condition corresponding to the pressed item key is input. The touch panel 201 can display at least the setting item window (initial window) displaying a plurality of setting item keys and a setting condition input window accepting input of a setting condition for a setting item corresponding to each of the plurality of setting item keys. The touch panel 201 is configured to detect an input operation on the plurality of setting item keys and an input operation on the setting condition input window. In addition, the touch panel 210 is configured to display a window displaying a plurality of shrunk setting condition input windows (described later) and detect an input operation on each of the setting condition input windows (for example, contact on a particular region corresponding to a displayed software key).

In the present embodiment, the touch sensor 201*b* is an analog resistive film type.

The touch sensor 201*b* has a structure in which an upper film having translucency and a lower glass substrate are piled up via a spacer.

On facing surfaces of the upper film and the lower glass base plate, a transparent electrode layer composed of ITO (Indium Tin Oxide) and the like is provided.

The touch sensor 201*b* is composed such that, upon pressing of the upper film by a user, the transparent electrode layer on the upper film side and the transparent electrode layer on the lower glass base plate side contact each other at a position corresponding to a pressed position (user-indicated position, contacted position, contacted area).

The touch sensor 201*b* applies a voltage to the upper film or the lower glass base plate, and extracts a voltage value corresponding to the depression position from the lower glass base plate or the upper film to thereby detect a coordinate position (depression position) corresponding to the voltage value.

Furthermore, a display unit 201*a* such as an LCD (liquid crystal display) or the like is provided below the lower glass base plate.

The display unit 201*a* is configured to display a setting item window 700, a setting condition input window 703, a window showing a plurality of shrunk setting condition input windows 703, and the like.

The display unit 201*a* is configured to also display a plurality of kinds of software keys including a function item key 701, a selection item key 704, a CANCEL key 705, and an OK key 706.

Furthermore, a stylus pen 202 is provided in the vicinity of the touch panel 201.

When the user makes a tip of the touch pen 202 contact on the touch panel 201 (touch sensor 201*b*), the touch panel 201 detects coordinate values corresponding to the contacted location (pressed location).

In a case in which a software key corresponding to (overlapping) the coordinate values thus detected is present (displayed), the touch panel 201 detects an operation (selection) on the software key.

In other words, the user can make an input operation (selection) on a predetermined software key by a stylus pen 202 among the plurality of software keys that is displayed.

Furthermore, in the vicinity of the touch panel 201, a predetermined number of operation keys 203 is provided, including, for example, numerical keys 204, a START key 205, a CLEAR key 206, a STOP key 207, a RESET key 208, and a POWER key 209.

Figure 3:
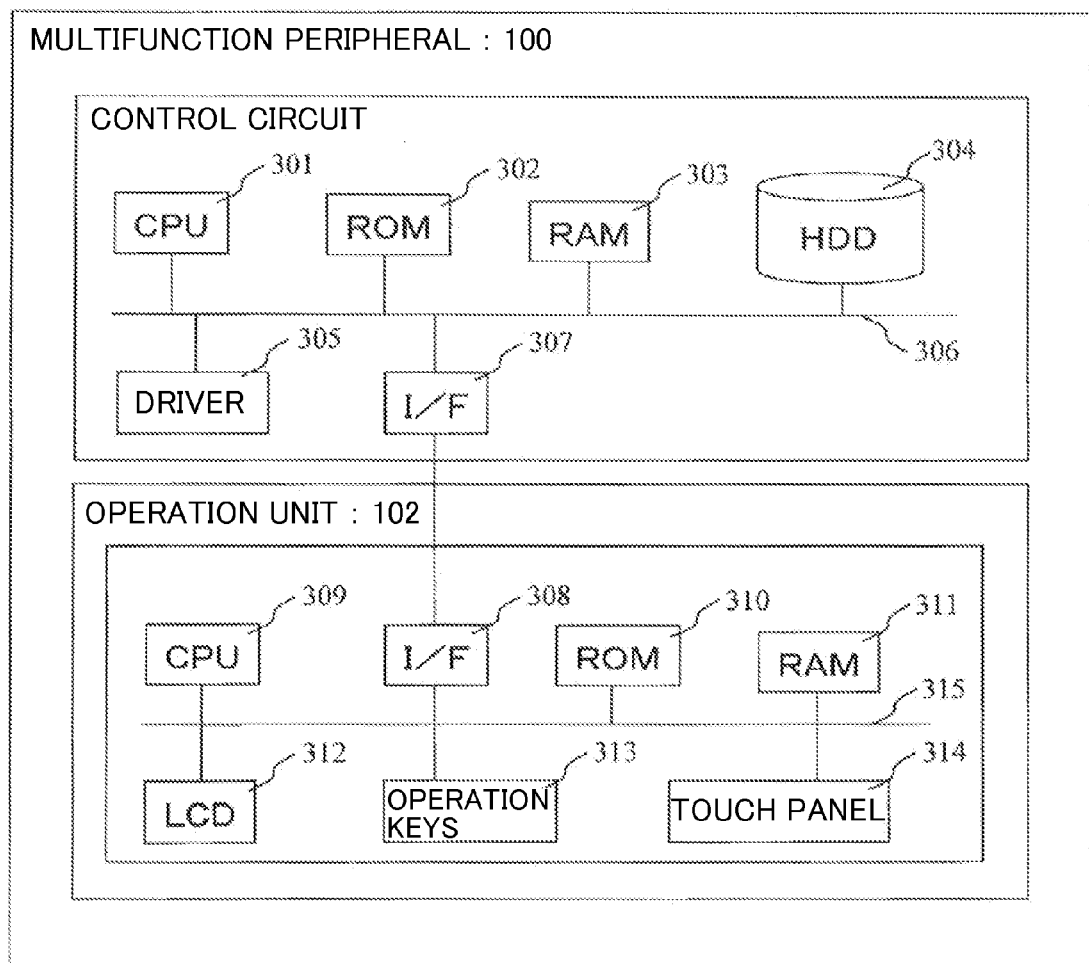
FIG. 3 is a diagram showing a configuration of a control system hardware of the multifunction peripheral and the operation unit according to the present disclosure.

Next, a hardware configuration of a control system of the multifunction peripheral 100 and the operation unit 102 is described with reference to FIG. 3. FIG. 3 is a diagram showing a configuration of a control system hardware of the multifunction peripheral 100 and the operation unit 102 according to the present disclosure. However, the details of each component not directly related to the present disclosure are omitted.

A control circuit of the multifunction peripheral 100 is configured such that a CPU (Central Processing Unit) 301, ROM (Read Only Memory) 302, RAM (Random Access Memory) 303, a HDD (Hard Disk Drive) 304, and drivers 305 respectively corresponding to the driving units are connected via an internal bus 306. The CPU 301 uses the RAM 303 as workspace, for example, and executes programs stored in the ROM 302, HDD 304, or the like, and sends and receives data and instructions from the driver 305 and the operation unit 102 (not illustrated) based on the execution result to control the operation of the driving units shown in FIG. 1. Each unit (illustrated in FIG. 4) described hereafter other than the drive units above is operated by execution of programs by the CPU 301.

In addition, an internal interface 307 is also connected to the internal bus 306 of the control circuit, and the internal interface 307 connects the control circuit of the operation unit 102, and the like to the control circuit of the multifunction peripheral 100. The CPU 301 may receive command signals from the control circuit of the operation unit 102 or the like through the internal interface 307, and may transmit command signals, data, or the like to the control circuit of the operation unit 102 or the like.

In addition, the control circuit of the operation unit 102 is configured by connecting a CPU 309, a ROM 310, a RAM 311, an LCD 312, operation keys 313 (203), a touch panel 314 (201), and an internal interface 308 together with an internal bus 315. When the user operates the operation keys 313 or the touch panel 314, the CPU 309 transmits command signals based on the operation to the control circuit of the multifunction peripheral 100 through the internal interface 308. The function of the CPU 309, the ROM 310, and the RAM 311 is the same as the above, and each unit described below (illustrated in FIG. 4) is realized by execution of programs by the CPU 309. The programs or data for realization of each unit described below are stored in the ROM 310.

Figure 4:
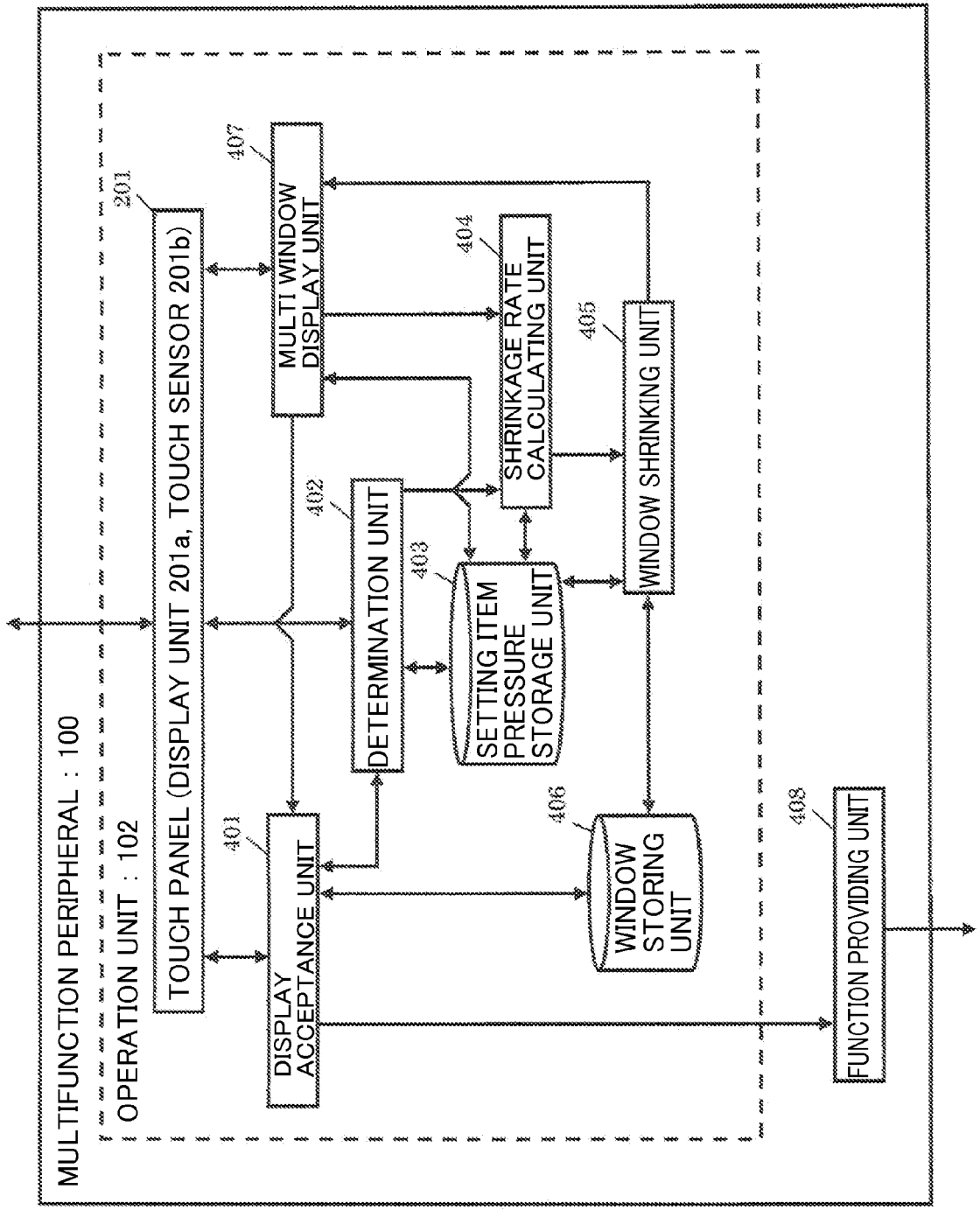
FIG. 4 is a functional block diagram of the multifunction peripheral and the operation unit according to an embodiment of the present disclosure.
Figure 5:
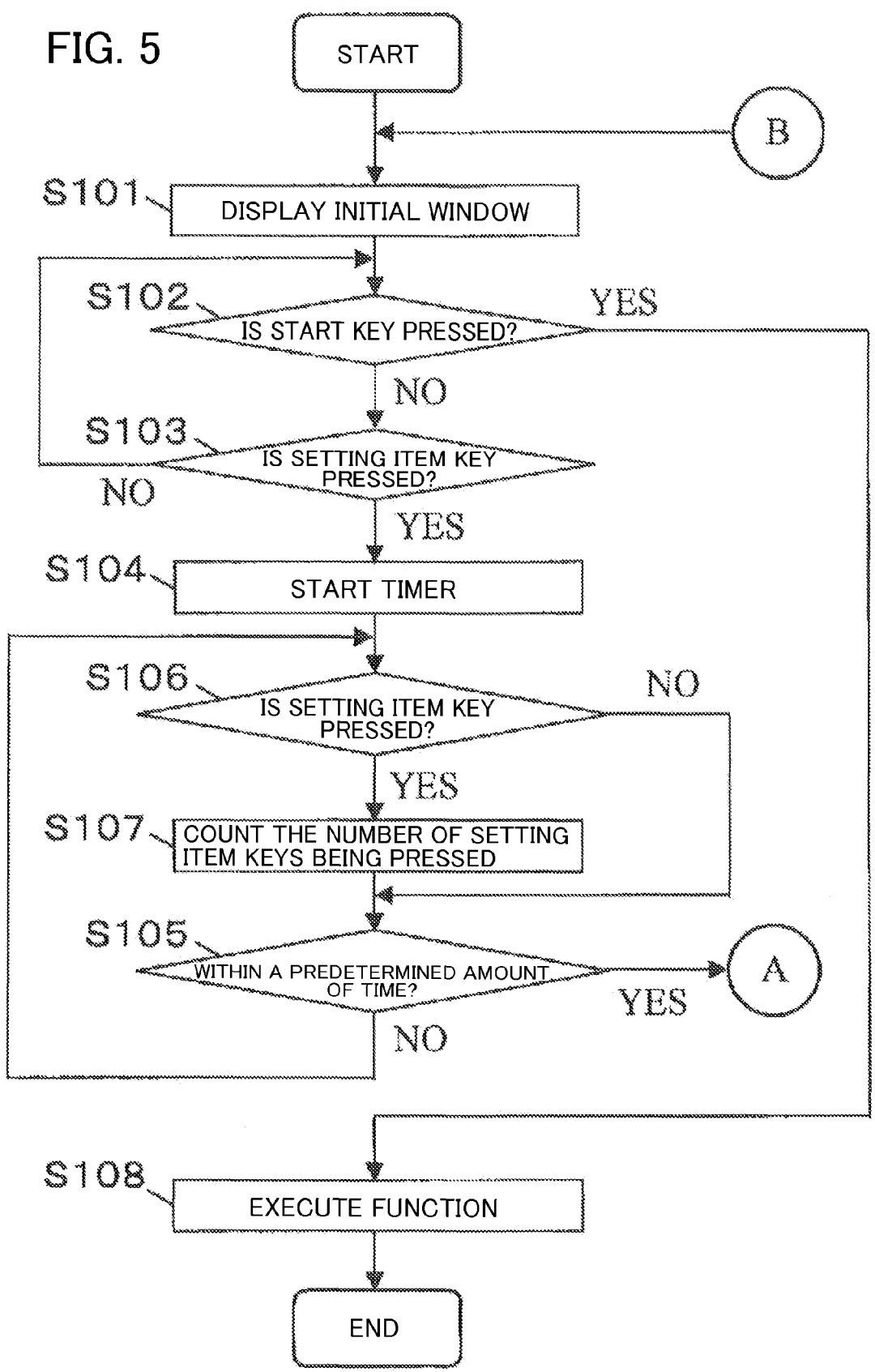
FIG. 5 is a first flowchart for showing execution procedures of the embodiment of the present disclosure.
Figure 6:
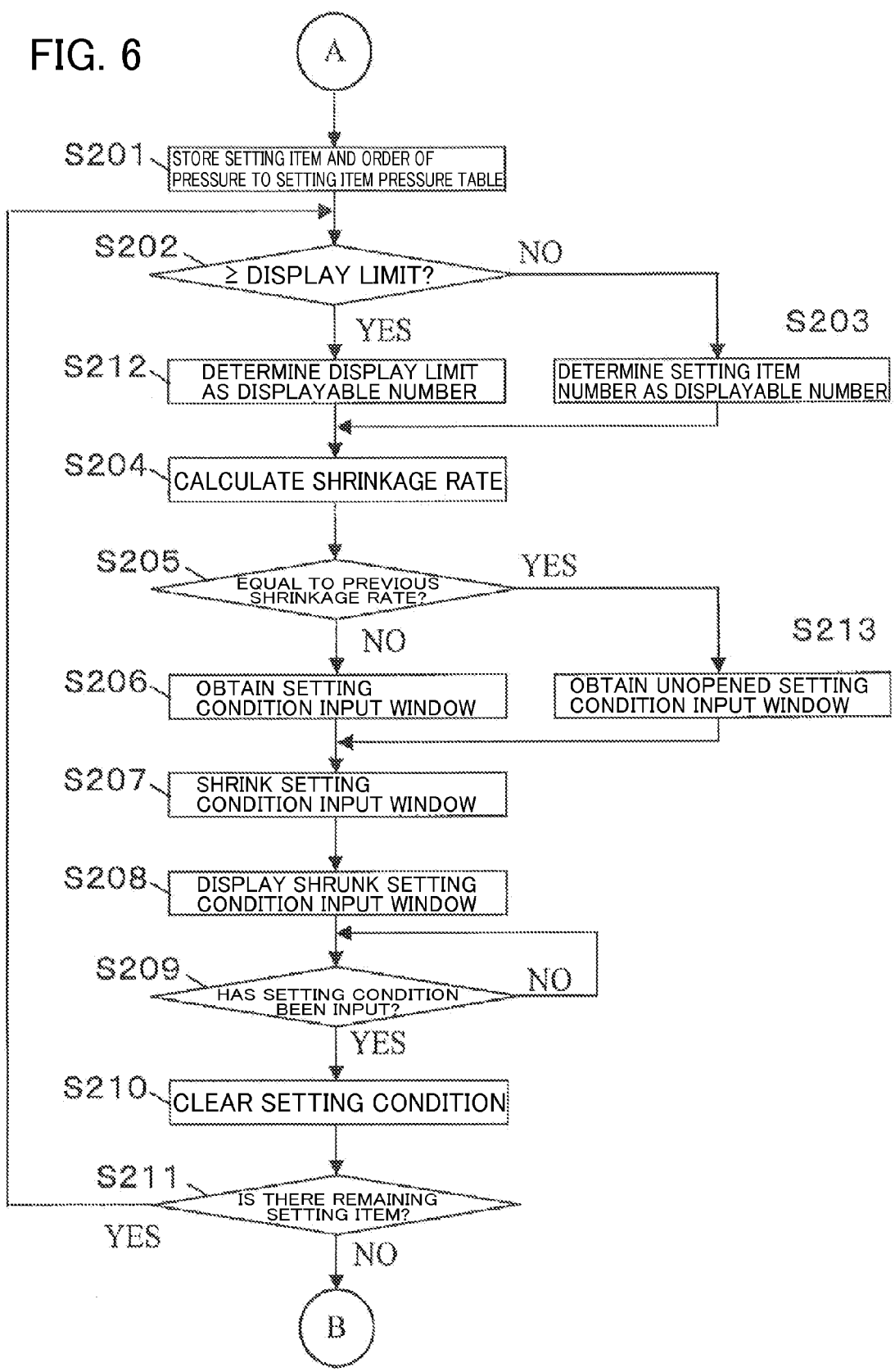
FIG. 6 is a second flowchart for showing execution procedures of the embodiment of the present disclosure.

Next, a configuration and execution procedure according to the embodiment of the present disclosure will be described with reference to FIGS. 4 to 6. FIG. 4 is a functional block diagram of the multifunction peripheral and the operation unit according to the present disclosure. FIGS. 5 and 6 are flowcharts illustrating the execution procedure according to the present disclosure.

First, when a user turns on the multifunction peripheral 100, the operation unit 102 is activated upon activation of the multifunction peripheral 100. Thereafter, a display acceptance unit 401 of the operation unit 102 thus turned on obtains initial values of the setting items stored in advance in predetermined initial setting condition memory as initial setting conditions, and stores the initial setting conditions thus obtained in predetermined setting condition memory as setting conditions.

Next, the display acceptance unit 401 displays an operation window reflecting the setting conditions (setting item window 700 as initial window) on the touch panel 201 (FIG. 5: Step S101).

The setting item window 700 displays, as shown in FIG. 7A, the plurality of setting item keys 701 (for example, "Duplex/Split" key, "Combine" key, and the like) composing the setting condition of the copy function and a function list key 702 for displaying a list of setting item keys not displayed on the setting item window 700, such that these keys can be pressed (operation on these keys can be detected).

Here, upon displaying the setting item window 700 on the touch panel 201, the display acceptance unit 401 notifies the determination unit 402 of the display thereof. In response to the notification, the determination unit 402 determines whether at least 2 of the plurality of setting item keys 701 are pressed within a predetermined period of time (for example, within 2 seconds) or not. The determination unit 402 determines whether an input operation to the plurality of setting item keys 701 is detected within a predetermined time period or not.

For example, if a user presses a predetermined setting item key 701 (for example, the "Duplex/Split" key 701a) (FIG. 5: Step S103YES) without pressing the START key 205 (FIG. 5: Step S102NO), the determination unit 402 accepts pressure (detection, selection) on the "Duplex/Split" key 701a and times an elapsed time since pressure (detection, selection) on the "Duplex/Split" key 701a, using a timer provided in advance (starting timer) (FIG. 5: Step S104). And then, the determination unit 402 compares the elapsed time with a predetermined period of time (2 seconds) defined in advance, and accepts pressure on other setting item keys 700 until the elapsed time exceeds the predetermined period of time. The determination unit 402 counts the number of the setting item keys 700, on which pressure is detected by the touch panel 201 within the predetermined period of time.

Here, in a case in which the elapsed time exceeds the predetermined period of time (FIG. 5: Step S105YES) without pressure on other setting item key 701 by the user (FIG. 5: Step S106NO), the determination unit 402 accepts (detects) the pressure on the setting item key 701a ("Duplex/Split" key) that is first pressed. And then, the determination unit 402 stores the setting item of the setting item key 701 that is pressed, to the setting item pressure table in a setting item pressure storage unit 403, in association with the ranking (rank order) of pressure thereof (FIG. 6: Step S201).

Here, as described above, in a case in which only one setting item key 701 is pressed (detected) within the predetermined period of time, the setting item "Duplex/Split" of the setting item key 701a that is pressed, and the rank order of pressure thereof "1" are stored to the setting item pressure table in association with each other.

Thereafter, the determination unit 402 notifies a shrinkage calculation unit 404 of detection of the setting item key 701.

In response to the notification, the shrinkage calculation unit 404 calculates a shrinkage rate allowing equal allocation of space for a predetermined number of setting condition input windows in the display region 900, based on the number of setting item keys 701 that are pressed (detected) and the size of the display region 900.

The shrinkage rate calculating unit 404 calculates, in a case in which the determination unit 402 determines that an input operation on the plurality of setting item keys 701 is detected within a predetermined time period, the shrinkage rate allowing equal allocation of space for a predetermined number, which is at least the number of setting item keys, of setting condition input windows 703 in the display region 900 based on the number of setting items, which is the number of setting item keys 701 on which the input operation is detected, and the size of display region 900 in a case of displaying only one setting condition input window 703 on the touch panel 201.

The shrinkage rate calculating unit 404 restricts the number of setting items used for calculating the shrinkage rate, based on any one of: a display limit defined in advance; the size of an image in the setting condition input window after shrinkage; and the font size of characters in the setting condition input window after the shrinkage.

The shrinkage rate calculating unit 404 determines whether the number of setting items is at least the display limit defined in advance, and then calculates the shrinkage rate based on the display limit and the size of the display region 900 if the number of setting items is at least the display limit or calculates the shrinkage rate based on the number of setting items and the size of the display region 900 if the number of setting items is smaller than the display limit.

Here, the size of the display region can be represented by an area thereof, or lengths in predetermined directions including a vertical direction (depth direction), horizontal direction (width direction), and an oblique direction.

A calculation method for the shrinkage rate is not particularly limited; for example, the shrinkage rate calculating unit 404 obtains the number of setting item key(s) 701 ("1") that is pressed (detected) as a setting item number, by counting the number of setting item(s) stored in the setting item pressure table.

And then, the shrinkage rate calculating unit 404 obtains information of the display limit (for example, "3"), which is a predetermined threshold stored (defined) in advance in predetermined memory, and determines whether the setting item number is at least the display limit or not (FIG. 6: Step S202).

If the setting item number ("1") is determined to be smaller than the display limit ("3") (FIG. 6: Step S202NO), the shrinkage rate calculating unit 404 defines the setting item number ("1") as the displayable number of the setting condition input windows on the display region (FIG. 6: Step S203). A case in which the setting item number is at least the display limit (FIG. 6: Step S202YES) is described later.

Next, the shrinkage rate calculating unit 404 obtains information of the size of the display region (for example, the size of entire display region of the touch panel 201) that is stored in predetermined memory in advance. The shrinkage rate calculating unit 404 calculates the shrinkage rate in a case of dividing the display region by the displayable number thus defined ("1"). Here, as the displayable number is "1", the shrinkage rate is calculated to be "1" (FIG. 6: Step S204).

Upon completion of calculation of the shrinkage rate, the shrinkage rate calculating unit 404 notifies a window shrinking unit 405 of the completion.

The window shrinking unit 405 shrinks a predetermined number of setting condition input windows 703 among the setting condition input windows 703 for accepting an input of a setting condition for the setting item corresponding to the setting item keys 701 on which the input operation is detected, based on the shrinkage rate calculated by the shrinkage rate calculating unit 404.

The window shrinkage unit 405 shrinks a predetermined number of the setting condition input windows, which rank high in the order of acceptance of the input operation on the corresponding setting item keys 701, among the setting condition input windows 703 accepting the input of a setting condition for the setting item corresponding to the setting item keys 701 on which the input operation is detected, based on the shrinkage rate calculated by the shrinkage rate calculating unit 404.

In the present embodiment, in response to the notification, the window shrinking unit 405 shrinks the setting condition input window(s) corresponding to the predetermined number of setting item keys 701 which rank high in the order of acceptance of the input operation, based on the calculated shrinkage rate.

A shrinking method for the setting condition input window is not particularly limited; for example, the window shrinking unit 405 determines whether the shrinkage rate currently calculated is the same as the shrinkage rate previously calculated (FIG. 6: Step S205).

Here, the window shrinking unit 405 determines that the shrinkage rate currently notified is not the same as the previous shrinkage rate (FIG. 6: Step S205NO) since the shrinkage rate previously calculated is not notified, and then refers to the setting item pressure table and obtains the only setting item stored therein ("Duplex/Split"). The setting condition input window corresponding to the setting item is configured in advance so as to fit the display region of the touch panel 201. The window shrinking unit 405 then obtains the setting condition input window corresponding to the setting item thus obtained, from the window storage unit 406 (FIG. 6: Step S206), and shrinks the horizontal size of the setting condition input window to 1 based on the shrinkage rate (FIG. 6: S207). Here, the shrinkage rate is "1", making the shrunk setting condition input window the same size as the setting condition input window before shrinkage.

Upon completion of shrinkage of the setting condition input window, the window shrinkage unit 405 notifies a multi window display unit 407.

In response to the notification, the multi window display unit 407 displays the predetermined number of shrunk setting condition input window(s) in the display region, in an arrangement corresponding to the rank order of the setting item key(s) that is pressed (FIG. 6: Step S208).

The multi window display unit 407 displays the predetermined number of setting condition input window(s) 703 that is shrunk by the window shrinking unit 405 in the display region 900. The multi window display unit 407 displays the predetermined number of setting condition input window(s) 703 that is shrunk by the window shrinking unit 405 in the display region 900, in an arrangement corresponding to the rank order of detection.

Here, the shrunk setting condition input window has the same size as the setting condition input window before shrinkage, the multi window display unit 407 displays the shrunk setting condition input window as is, on the touch panel 201.

Figure 7B:
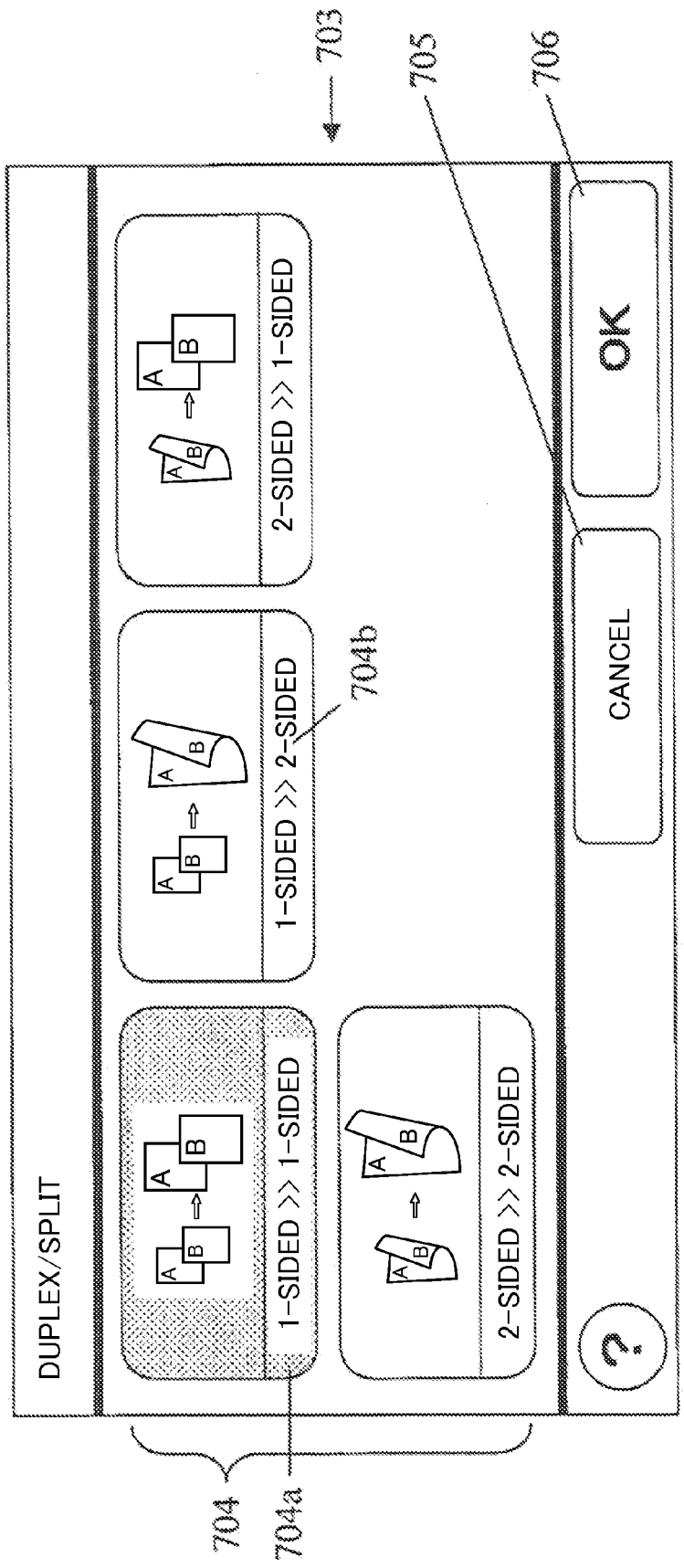
FIG. 7B is a diagram illustrating an example of a predetermined setting condition input window displayed on the touch panel according to the embodiment of the present disclosure.

As shown in FIG. 7B, the setting condition input window 703 is displayed on the touch panel 201 such that an input operation on the plurality of setting item keys 704 corresponding to the setting condition of the "Duplex/Split", the CANCEL key 705, and the OK key 706 can be detected. It should be noted that, among the setting item keys 704 on the setting condition input window 703, a setting item key corresponding to the setting condition (initial condition) of the setting condition (for example, "1-sided>>1-sided" key 704a) is displayed with a gray background.

Here, if the user presses a predetermined setting item key (for example, "1-sided>>2-sided" key 704b) among the plurality of setting item keys 704 and then presses the OK key 706 in the setting condition input window 703 (FIG. 6: Step S209YES), the multi window display unit 407 accepts the input of the setting condition and clears the setting item corresponding to the setting condition thus input ("Duplex/Split") and the rank order thereof ("1") from the setting condition pressure table (FIG. 6: Step S210).

Thereafter, the multi window display unit 407 determines whether there is a remaining setting item key for which a setting condition has not been input, among the setting item key on which an input operation is detected in a state in which the setting item window 700 is displayed.

Upon completion of input of the setting condition for the predetermined setting item via the shrunk setting condition input window 703 by means of the touch panel 201, the multi window display unit 407 determines whether there is a remaining setting item key for which a setting condition of the corresponding setting item has not been input, among the setting item key on which an input operation is detected.

In other words, the multi window display unit 407 determines whether there is still a predetermined setting item in the setting item pressure table 800 (FIG. 6: Step S211).

Since there is no predetermined setting item left in the setting item pressure table (FIG. 6: Step S211NO), the multi window display unit 407 notifies the display acceptance unit 401.

In response to the notification, returning to Step S101, the display acceptance unit 401 accepts a setting condition for a setting item and displays a setting item window on the touch panel (FIG. 5: Step S101).

As described above, in a state in which the setting item window is displayed on the touch panel 201, if an input operation for a setting item key 701 is detected within the predetermined period of time, a single setting condition input window is displayed in the display region 900 of the touch panel 201. And then, an input operation to the setting condition input window is accepted and, upon completion of input of setting condition for a corresponding setting item, the setting item window (initial window) is displayed again.

On the other hand, in a state in which the setting item window is displayed on the touch panel 201, if input operations for a plurality of setting item keys 701 are detected within the predetermined period of time, the following processing takes place.

In Step S106, if a user presses another setting item key 701 (FIG. 5: Step S106YES) within a predetermined period of time (FIG. 5: Step S105NO), the determination unit 402 accepts information of pressure (input operation) on the another setting item key 701 and counts the setting item key 701 thus pressed (on which an input operation is detected) (FIG. 5: Step S107).

For example, as shown in FIG. 7A, in a case in which a user presses, after pressing the "Duplex/Split" key 701a, other setting item keys 701: a "Combine" key 701b; a "Staple/Punch" key 701c; and a "Density" key 701d in this order (FIG. 5: S106YES), the determination unit 402 accepts information relating to the setting item keys 701 that are pressed (on which input operation is detected) and counts the number of the setting item keys 701 that are pressed (on which input operation is detected (FIG. 5: Step S107).

And then, when the elapsed time exceeds the predetermined period of time (FIG. 5: S105YES), the determination unit 402 stores the information of at least 2 setting item keys 701 on which pressure (input operation) is detected and information of an order of detection of pressure (input operations) in association with each other, to the setting item pressure table of the setting item pressure storage unit 403 (FIG. 6: Step S201).

Here, since a plurality of setting item keys 701 is pressed, the setting items ("Duplex/Split", "Combine", "Staple/Punch" and "Density") of the setting item keys 701 that are pressed (detected) and rank order of pressure (order of detection of pressure) of the setting item keys 701 ("1", "2", "3" and "4") are stored in association with each other in the setting item pressure table 800.

Thereafter, the determination unit 402 notifies a shrinkage calculation unit 404 of detection of the setting item key 701.

In response to the notification, the shrinkage calculation unit 404 calculates a shrinkage rate allowing equal allocation of space for a predetermined number of setting condition input windows in the display region 900, based on the number of setting item keys 701 that are pressed (detected) and the size of the display region 900 in a case of displaying only one setting condition input window.

Here, as described above, the shrinkage rate calculating unit 404 obtains the number of setting item keys 701 ("4") that are pressed as the setting item number, by counting the number of setting items 801 stored in the setting item pressure table 800.

And then, the shrinkage rate calculating unit 404 obtains information of the display limit (for example, "3") and determines whether the setting item number is at least the display limit or not (FIG. 6: Step S202).

As a result of the determination, if the setting item number ("4") is greater than the display limit ("3") (FIG. 6: Step S202YES), the shrinkage rate calculating unit 404 defines the display limit ("3") as the displayable number (FIG. 6: Step S202).

By limiting the number of setting condition input windows to be displayed in the display region to a predetermined threshold, the multifunction peripheral 100 (operation unit 102) can be configured to prevent reduction in visibility from the user due to display of too many setting condition input windows at once.

Figure 8B:
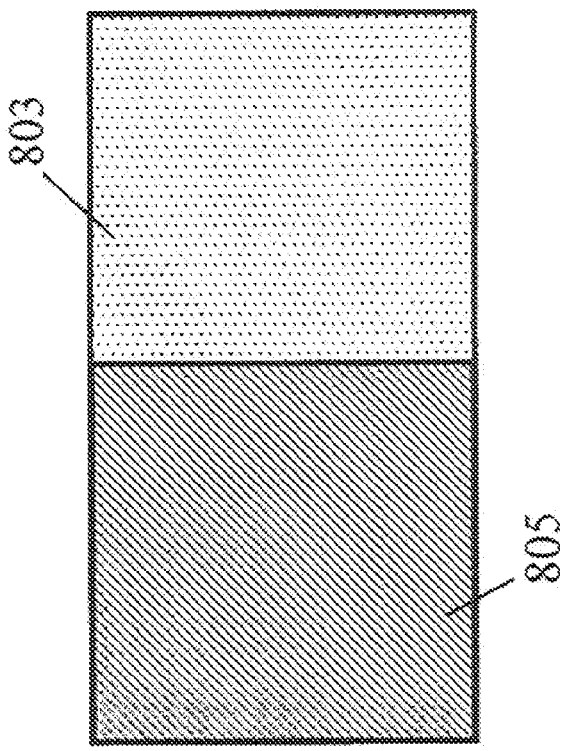
FIG. 8B is a schematic view for explaining calculation of a shrinkage rate according to the embodiment of the present disclosure.
Figure 8B:
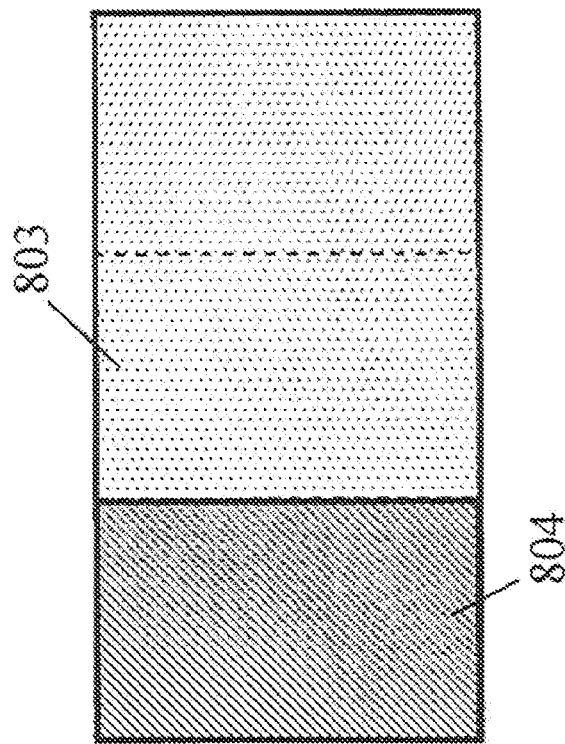

Next, the shrinkage rate calculating unit 404 obtains information of the size of the display region. A size image 803 of the display region, which is an image representing the size of the display region, represents, for example, a size of a horizontally long display region as shown in FIG. 8B. The shrinkage rate calculating unit 404 divides the display region equally in a horizontal direction to the displayable number ("3") (dividing into three), based on the size thereof. In this case, the shrinkage rate calculating unit 404 calculates the shrinkage rate "⅓" as the shrinkage rate in the horizontal direction, based on the size 804 of a divided display region and the size 803 of the display region before division (FIG. 6: Step S204). Here, the shrinkage rate calculating unit 404 calculates the shrinkage rate in a vertical direction to be "1".

Upon completion of calculation of the shrinkage rate, the shrinkage rate calculating unit 404 notifies a window shrinking unit 405 of the completion.

In response to the notification, the window shrinking unit 405 shrinks the setting condition input windows corresponding to the predetermined number of setting item keys 701 which rank high in the order of acceptance of the input operation (order of detection), based on the calculated shrinkage rate.

Here as described above, the window shrinking unit 405 determines whether the shrinkage rate currently calculated is the same as the shrinkage rate previously calculated (FIG. 6: Step S205).

Here, the window shrinking unit 405 determines that the shrinkage rate currently notified is not the same as the previous shrinkage rate (FIG. 6: Step S205NO) since the shrinkage rate previously calculated is not notified. The window shrinking unit 405 refers to the setting item pressure table 800 and obtains the predetermined number (displayable number, "3") of setting items 801 ("Duplex/Split", "Combine" and "Staple/Punch") in this order, according to the rank order of pressure (detection). The window shrinking unit 405 then obtains again the setting condition input window corresponding to the setting item 801 thus obtained, from the window storage unit 406 (FIG. 6: Step S206), and shrinks the horizontal size of the setting condition input window to "⅓" based on the shrinkage rate (FIG. 6: S207).

Upon completion of shrinkage of the predetermined number of setting condition input windows, the window shrinkage unit 405 notifies the multi window display unit 407.

In response to the notification, the multi window display unit 407 displays the predetermined number of shrunk setting condition input windows in the display region, in an arrangement corresponding to the rank order of the setting item keys that are pressed (FIG. 6: Step S208).

Figure 9A:
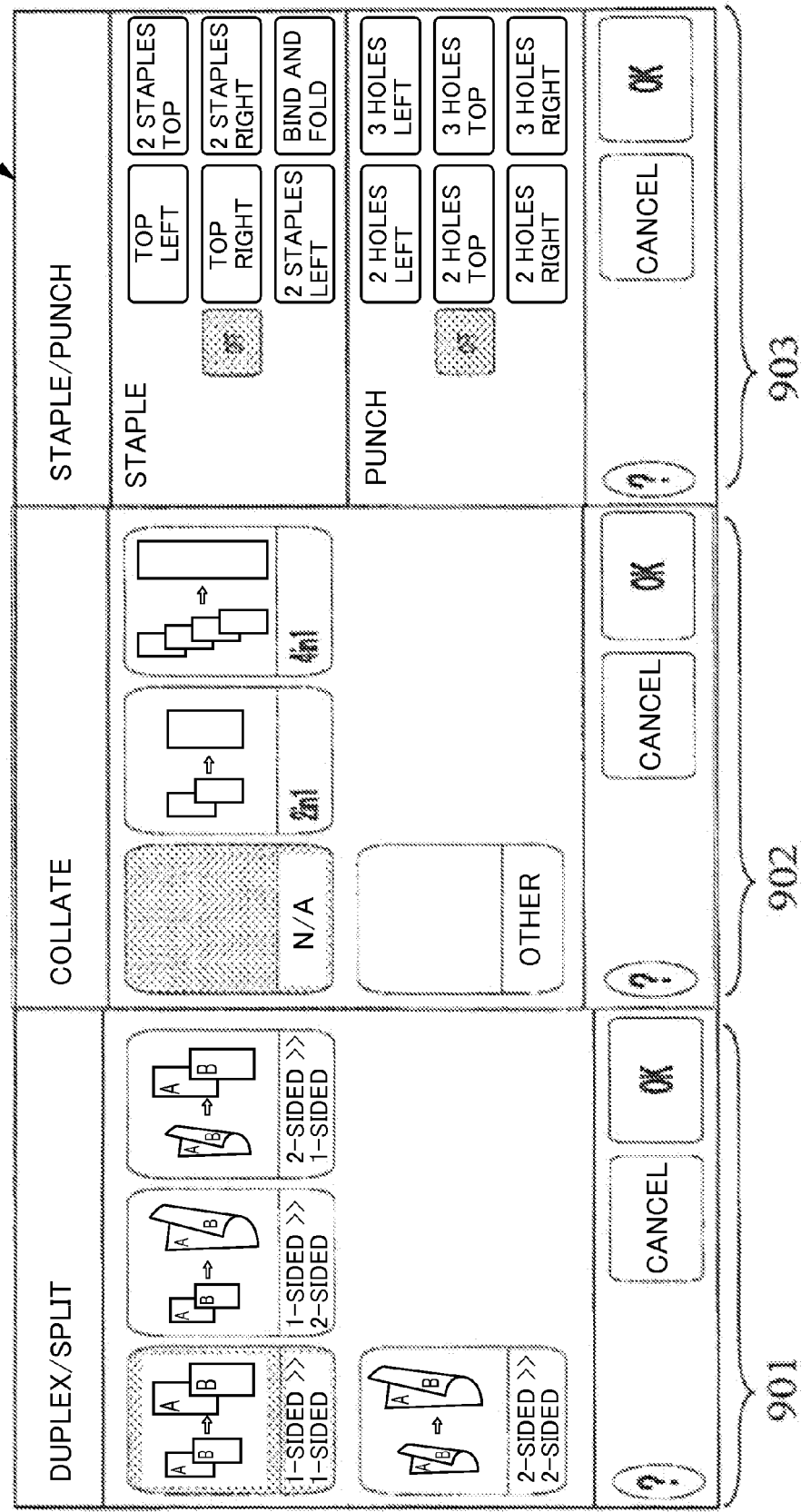
FIG. 9A is a first diagram illustrating an example of a shrunk setting condition input window displayed on the touch panel according to the embodiment of the present disclosure.

An arrangement pattern of the setting condition input windows is not particularly limited. For example, as shown in FIG. 9A, the multi window display unit 407 displays the shrunk setting condition input window 901 for the setting item "Duplex/Split", which ranks first in the order of pressure, in a left end part of the display region 900 of the touch panel 201; and displays the shrunk setting condition input window 902 for the setting item "Combine" and the shrunk setting condition input window 903 for the setting item "Staple/Punch" horizontally, according to the order of pressure.

As a result, the multifunction peripheral 100 (operation unit 102) is configured to display only the predetermined number of shrunk setting condition input windows are displayed in the predetermined display region 900, in response to pressure by the user on a plurality of setting item keys 701 in a state in which the setting item window 701 is displayed on the touch panel 201. The multifunction peripheral 100 (operation unit 102) is thus configured such that the contents of the setting condition input windows can be confirmed at a glance. In addition, the setting condition input windows are a shrunk version of original setting condition input windows. The multifunction peripheral 100 (operation unit 102) is thus configured such that a user can understand the contents of the shrunk setting condition input windows at a glance, preventing confusion.

In Step S208, when the user inputs a predetermined setting condition ("1-sided>>2-sided") via the shrunk setting condition input window 901 corresponding to the setting item ("Duplex/Split") and presses the OK key in the setting condition input window, the multi window display unit 407 accepts input of the setting condition (FIG. 6: Step S209YES). Thereafter, the multi window display unit 407 clears the setting item ("Duplex/Split") for which the setting condition has been input and information of the ranking ("1") thereof, from the setting item pressure table 800 (FIG. 6: Step S210).

The multi window display unit 407 then determines whether there is still a predetermined setting item in the setting item pressure table 800 (FIG. 6: Step S211).

Here, since there are still a predetermined number of setting items ("Combine", "Staple/Punch" and "Density") (FIG. 6: Step S211YES), the multi window display unit 407 determines that there are remaining setting items corresponding to the setting item keys that have been pressed and notifies the shrinkage rate calculating unit 404. In response to the notification, the shrinkage rate calculating unit 404 returns to Step S202 and determines whether the number of remaining setting items is at least the display limit.

As described above, in a state in which a plurality of shrunk setting condition input windows 703 is displayed in the display region 900, upon completion of input of the setting condition for the predetermined setting item via the shrunk setting condition input window 703 by means of the touch panel 201, the multi window display unit 407 determines whether there is a remaining setting item key for which a setting condition of the corresponding setting item has not been input, among the setting item key on which an input operation is detected.

In a case in which there is the remaining setting item key, the multi window display unit 407 causes the shrinkage rate calculating unit 404 to calculate a new shrinkage rate based on the number of remaining setting item key(s).

Here, the setting item number in the setting item pressure table 800 decreases from "4" to "3", the number of remaining setting items "3" is equal to the display limit "3". Given this, the shrinkage rate calculating unit 404 determines the display limit ("3") as the displayable number (FIG. 6: Step S202YES to Step S212), and calculates the shrinkage rate in the horizontal direction to be "⅓" as described above (FIG. 6: Step S204).

The shrinkage rate calculating unit 404 calculates a new shrinkage rate based on the number of remaining setting item key(s).

And then, given the new shrinkage rate, the window shrinking unit 405 determines whether the new shrinkage rate is the same as the previous shrinkage rate (FIG. 6: Step S205). Here, if the new shrinkage rate is determined to be the same as the previous shrinkage rate (FIG. 6: Step S205YES), the window shrinking unit 405 obtains an unobtained setting item ("Density"), in other words a setting item of which setting condition input window has not been displayed. In addition, the window shrinking unit 405 obtains the setting condition input window for the setting item "Density", of which setting condition input window has not been displayed, from the window storage unit 406 (FIG. 6: Step S212). The window shrinking unit 405 then shrinks the horizontal size of the setting condition input window thus obtained to "⅓", based on the previous shrinkage rate (FIG. 6: Step S207).

As described above, in a case in which the shrinkage rate calculating unit 404 has calculated a new shrinkage rate, the window shrinking unit 405 determines whether the new shrinkage rate is the same as the previous shrinkage rate. Thereafter, the window shrinking unit 405 shrinks the setting condition input window corresponding to the setting item key based on the previous shrinkage rate in a case in which the new shrinkage rate is equal to the previous shrinkage rate; and shrinks the setting condition input window corresponding to the setting item key based on the new shrinkage rate in a case in which the new shrinkage rate is not equal to the previous shrinkage rate.

Information of the setting condition input windows for the setting items "Combine" and "Staple/Punch", already displayed, is retained. The window shrinking unit 405 targets only the setting condition input window of the setting item "Density", which has not been displayed.

The multi window display unit 407 further displays the shrunk setting item input window, which has not been displayed, in the display region (FIG. 6: Step S208).

Here, upon displaying the shrunk setting condition input window that has not been displayed, the multi window display unit 407 clears the shrunk setting condition input window for which the setting condition has been already input, and slides the shrunk setting condition input window for which the setting condition has not been input to a first side (left side) of the display region 900 to slidingly display the shrunk setting condition input window that has not been displayed from a second side (right side) to the first side (left side) of the display region 900 (slide-in).

When the shrunk setting condition input window is to be displayed in which an unopened setting condition input window, which is the setting condition input window for the setting item of which setting condition input window has not been displayed, among the items corresponding to the detected setting item keys, is shrunk, the multi window display unit 407: clears the shrunk setting condition input window to which the setting condition is already input via the touch panel 201; slides the shrunk setting condition input window displayed on the display region 900, to which the setting condition is not input, to the first side of the display region 900; and slides the shrunk input window not displayed on the display region 900, in which unopened setting condition input window is shrunk, from the second side to the first side of the display region 900.

Figure 9B:
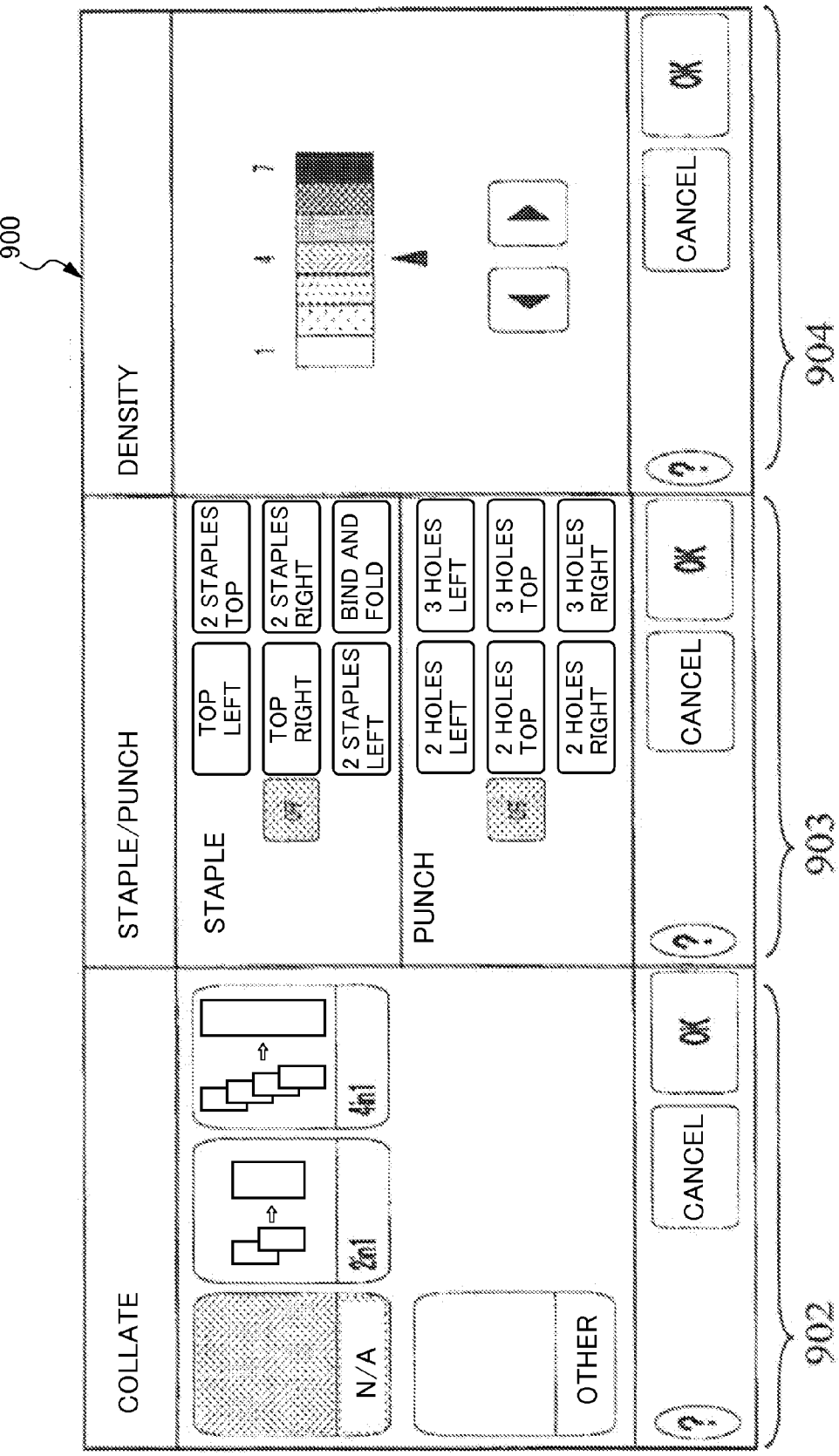
FIG. 9B is a second diagram illustrating an example of the shrunk setting condition input window displayed on the touch panel according to the embodiment of the present disclosure.

On the touch panel 201, the shrunk setting condition input window 902 for the setting item "Combine", which currently ranks first in the order of pressure, is arranged in a left end part of the display region 900, as shown in FIG. 9B. According to the rank order of pressure (order of detection), the shrunk setting condition input window 903 for the setting item "Staple/Punch" is arranged adjacent thereto (in a central part), on the touch panel. In addition, the shrunk setting condition input window 904 for the setting item "Density" as the unopened setting condition input window is newly arranged in a right end part, on the touch panel 201.

As a result, the multifunction peripheral 100 is configured to dynamically switch the shrunk setting condition input windows while maintaining available the shrunk setting condition input windows that have been already displayed before change of display content. The multifunction peripheral 100 can thus be configured to allow visual recognition of change in content of the shrunk setting condition input windows.

In Step S208, when the user inputs a predetermined setting condition ("2 in 1") via the shrunk setting condition input window corresponding to the setting item ("Combine") and presses the OK key in the setting condition input window, the multi window display unit 407 accepts input of the setting condition (FIG. 6: Step S209YES) and clears information relating to the setting item ("Combine") and the rank order ("2") thereof from the setting item pressure table 800 (FIG. 6: Step S210). The multi window display unit 407 then determines whether there is still a predetermined setting item in the setting item pressure table 800 (FIG. 6: Step S211).

Here, if the multi window display unit 407 determines that there are still a predetermined number of setting items ("Staple/Punch" and "Density") (FIG. 6: Step S211YES), the processing is returned to Step S202. And then, the shrinkage rate calculating unit 404 determines again whether the setting item number in the setting item pressure table 800 is at least the display limit ("3"). Since the setting item number in the setting item pressure table 800 has been reduced from "3" to "2", the shrinkage rate calculating unit 404 determines that the setting item number is smaller than the display limit ("3") (FIG. 6: Step S202NO). The shrinkage rate calculating unit 404 then determines the setting item number ("2") as the displayable number (FIG. 6: Step S203).

Next, the shrinkage rate calculating unit 404 calculates a shrinkage rate so as to divides the display region into the displayable number ("2"), equally in the horizontal direction, based on the size of the display region, as shown in FIG. 8B. The shrinkage rate calculating unit 404 calculates the new shrinkage rate "½" as the shrinkage rate in the horizontal direction, based on the size (image 804) of a divided display region and the size (image 803) of the display region before division (FIG. 6: Step S204). In addition, the shrinkage rate calculating unit 404 calculates the shrinkage rate in a vertical direction to be "1".

Here, the shrinkage rate "½" newly calculated is different from the previous shrinkage rate (⅓). Given this, the display shrinking unit 405 determines that the new shrinkage rate is different from the previous shrinkage rate (FIG. 6: S205NO). And then the display shrinking unit 405 newly obtains the setting condition input windows of the remaining setting items ("Staple/Punch", "Density") stored in the setting item pressure table 800 (FIG. 6: Step S213), and shrinks the setting condition input windows thus obtained to "½" in the width direction based on the new shrinkage rate (FIG. 6: Step S207). Thereafter, the multi window display unit 407 displays the two shrunk setting item input windows in the display region (FIG. 6: Step S208).

On the touch panel 201, as shown in FIG. 10A, the shrunk setting condition input window 1001 for "Staple/Punch", which currently ranks first in the order of pressure, is arranged in the left end part of the display region 1000, and the shrunk setting condition input window 1002 for "Density" is aligned therewith horizontally, in an adjacent part (the right end part).

As a result, the multifunction peripheral 100 (operation unit 102) is configured such that the new shrinkage rate will be greater than the previous shrinkage rate with a smaller number of setting condition input windows to be displayed, to thereby improve visibility and operability for a user.

Figure 10B:
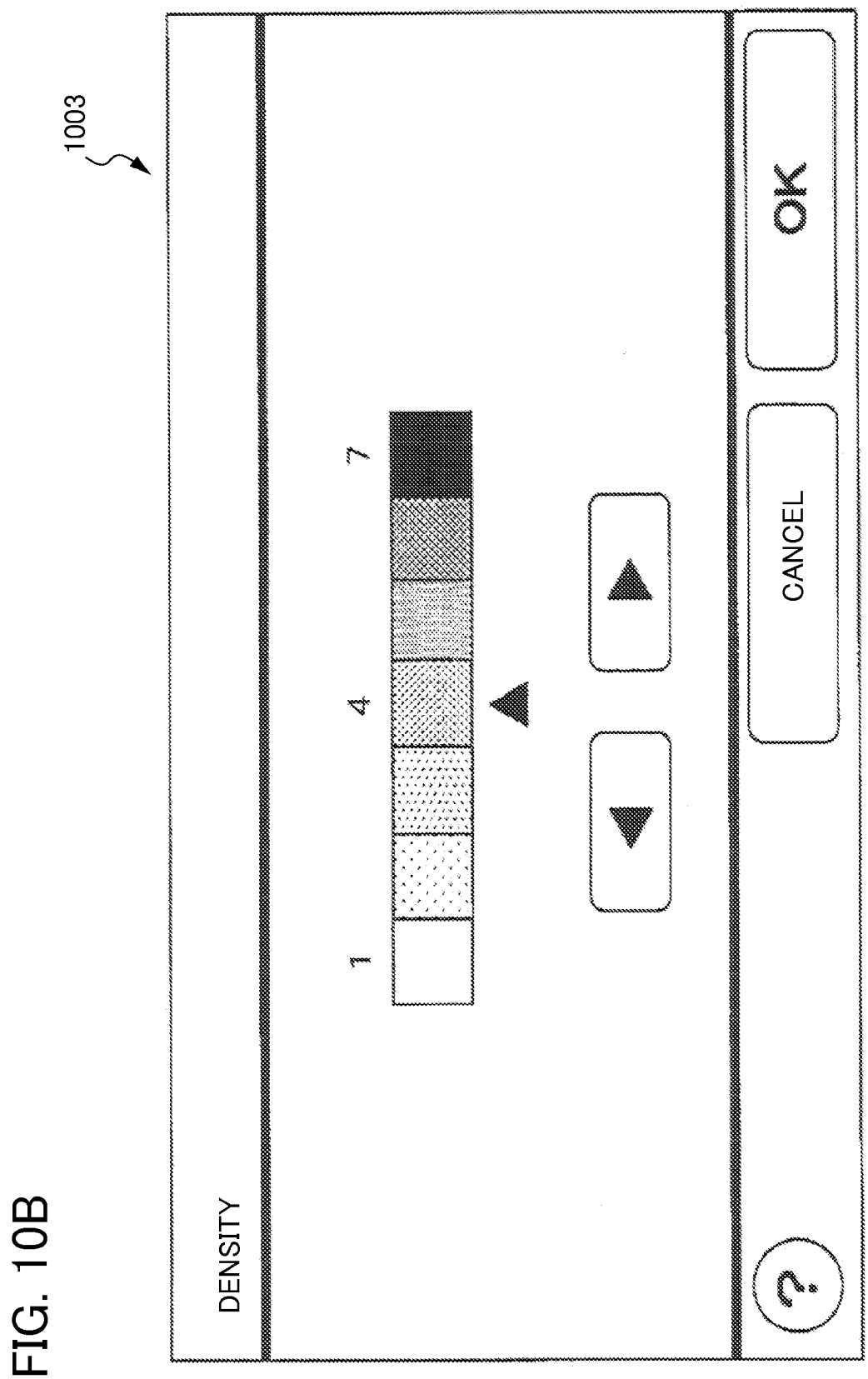
FIG. 10B is a fourth diagram illustrating an example of the shrunk setting condition input window displayed on the touch panel according to the embodiment of the present disclosure.

In Step S209, furthermore, when input of the setting condition for the predetermined setting item ("Staple/Punch") is completed (FIG. 6: Step S209YES) and the setting item number stored in the setting item pressure table 800 becomes "1" (FIG. 6: Step S210-Step S211YES), the shrinkage rate calculating unit 404 calculates the shrinkage rate to be "1", based on the setting item number "1" (FIG. 6: Step S202NO-Step S203-Step S204). In this case, as shown in FIG. 10B, the setting condition input window 1003 for the setting item ("Density") is displayed in the display region 900 without shrinkage (FIG. 6: Step S205NO-Step S206-Step S207-Step S208).

In Step S208, when a user completes input of a predetermined setting condition (for example, density level "3") via the setting condition input window 1003 for the last setting item "Density" (FIG. 6: Step S209YES), the multi window displaying unit 407 accepts input of the setting condition (density level "3"). Thereafter, the multi window display unit 407 clears the last setting item ("Density") and information of the ranking ("4") thereof, from the setting item pressure table 800 (FIG. 6: Step S210).

Here, since there is no predetermined setting item left in the setting item pressure table (FIG. 6: Step S211NO), the multi window display unit 407 notifies the display acceptance unit 401.

In response to the notification, the display acceptance unit 401 accepts the setting condition for each setting item being input, and displays the setting item windows reflecting the setting condition for each setting item thus accepted on the touch panel (FIG. 5: Step S101).

As a result, according to the multifunction peripheral 100 (operation unit 102) a user can complete input of setting conditions for a plurality of setting items without needing to return to a predetermined window (for example, the setting item window as the initial window) by performing input operations (pressure) to a plurality of setting item keys on the setting item window, which is the initial window.

As described above, in the multifunction peripheral 100 (operation unit 102), it is not necessary to bring the display window back to the setting item window, which is the initial window, each time input of the setting condition is completed in a certain setting condition input window. Therefore, the multifunction peripheral 100 (operation unit 102) is configured to reduce the number of steps required to input the setting condition and the time required for operation.

In Step S101, when the user looking at the setting item window (initial window) presses the START key 205 (FIG. 5: Step S102YES), the display acceptance unit 401 accepts the pressing of the START key 205 and notifies the function providing unit 408 of the setting condition being input for each setting item.

In response to the notification, the function providing unit 408 performs the copy function based on the setting condition for each setting item (FIG. 5: S108). The user thus can use the copy function under desired setting conditions.

As described above, the operation unit 102 according to the present disclosure includes: the determination unit 402 that determines whether an input operation (pressure) to the plurality of setting item keys is detected within a predetermined time period by the touch panel 201;

the shrinkage rate calculating unit 404 that calculates, in a case in which the determination unit 402 determines that an input operation on the plurality of setting item keys 701 is detected within a predetermined time period, a shrinkage rate allowing equal allocation of space for a predetermined number, which is at least a setting item number, which is the number of setting item keys 701 on which the input operation is detected, of setting condition input windows 703 in the display region 900 based on the setting item number, and a size of the display region 900 in a case of displaying only one setting condition input window 703 on the touch panel;

the window shrinkage unit 405 that shrinks a predetermined number of the setting condition input windows, which rank high in the order of acceptance of the input operation on the corresponding setting item keys 701, among the setting condition input windows 703 accepting the input of a setting condition for the setting item corresponding to the setting item keys 701 on which the input operation is detected, based on the shrinkage rate calculated by the shrinkage rate calculating unit 404; and the multi window display unit 407 that displays the predetermined number of setting condition input windows 703 that are shrunk by the window shrinking unit 405 in the display region 900, in an arrangement corresponding to the order.

The multifunction peripheral 100 (operation unit 102) is thus configured to display a predetermined number of shrunk setting condition input windows in a predetermined display region, as a result of first pressing a plurality of setting item keys. The multifunction peripheral 100 (operation unit 102) is thus configured such that the contents of the setting condition input windows can be confirmed at a glance. Furthermore, since the setting condition input window is a shrunk version of original setting condition input window, the multifunction peripheral 100 (operation unit 102) can be configured such that a user can understand the contents of the shrunk setting condition input windows at a glance, preventing confusion.

In addition, the multifunction peripheral 100 (operation unit 102) is configured such that a user can complete input of setting conditions for a plurality of setting items without returning to a predetermined window (for example, the setting item window as the initial window) by pressing a plurality of setting item keys on the setting item window, which is the initial window. Therefore, the multifunction peripheral 100 (operation unit 102) is configured to reduce the number of steps required to input the setting condition and the time required for operation by eliminating the need of returning to the setting item window as the initial window for inputting the setting condition for a certain setting condition input window.

In the multifunction peripheral 100 (operation unit 102) according to the embodiment of the present disclosure, the shrinkage rate calculating unit 404 calculates the shrinkage rate by equally dividing the display region horizontally; however, the present disclosure is not limited thereto. For example, in the multifunction peripheral 100 (operation unit 102), the shrinkage rate calculating unit 404 can also calculate the shrinkage rate by equally dividing the display region vertically.

In addition, in the operation unit 102 according to the embodiment of the present disclosure, the determination unit 402 determines pressure on individual setting item keys, in other words simultaneous pressure on a plurality of separate setting item keys, for determining whether at least two setting item keys are pressed within a predetermined period of time; however, the operation unit 102 can also be configured to determine sequential pressure on a plurality of sequential setting item keys.

In addition, in the multifunction peripheral 100 (operation unit 102), the shrinkage rate calculating unit 404 restricts the number of setting items used for calculating the shrinkage rate, based on any one of: a display limit defined in advance; the size of an image in the setting condition input window after shrinkage; and the font size of characters in the setting condition input window after the shrinkage. In the above embodiment of the present disclosure, the display limit is employed; however, the shrinkage rate calculating unit 404 can restrict the number of setting condition input windows also by using any one of: size of an image in the shrunk setting condition input window; and font size of characters in the shrunk setting condition input window.

For example, in a case of employing the size of an image in the shrunk setting condition input window, the shrinkage rate calculating unit 404 calculates the shrinkage rate based on the number of setting item keys being pressed and the size of the display region, and then the window shrinking unit 405 shrinks the predetermined number of setting condition input windows for the setting item keys that rank high in the order of pressure based on the shrinkage rate thus calculated.

The shrinkage rate calculating unit 404 compares the size of the image in the shrunk setting condition input window with the size of an image as a threshold, defined in advance, and determines whether the size of the image in the shrunk setting condition input window is smaller than the size of threshold image. As a result of the determination, if the size of the image in the shrunk setting condition input window is smaller than the size of threshold image, the shrinkage rate calculating unit 404 subtracts a predetermined value (for example, "1") from the number of setting item keys being pressed, and calculates a new shrinkage rate based on the subtracted number of setting item keys and the size of the display region. On the other hand, if the size of the image in the shrunk setting condition input window is at least equal to the size of threshold image, the predetermined number of shrunk setting condition input windows are used. Reduction in visibility from a user can thus be prevented.

For another example, in a case of employing the font size of characters in the shrunk setting condition input window, the shrinkage rate calculating unit 404 compares the font size of characters in the shrunk setting condition input window being shrunk based on the number of setting item keys and the size of the display region with the font size defined in advance as a threshold, and determines whether the font size of characters in the shrunk setting condition input window is smaller than the threshold font size. As a result of the determination, if the font size of characters in the shrunk setting condition input window is smaller than the threshold font size, the shrinkage rate calculating unit 404 subtracts a predetermined value (for example, "1") from the number of setting item keys being pressed, and calculates a new shrinkage rate based on the subtracted number of setting item keys and the size of the display region. On the other hand, if the font size of characters in the shrunk setting condition input window is at least equal to the threshold font size, the predetermined number of shrunk setting condition input windows are used. Reduction in visibility from a user can thus be prevented in the multifunction peripheral 100 (operation unit 102).

The operation unit 102 according to the embodiment of the present disclosure is employed in the multifunction peripheral having the copy function; however, the operation unit 102 can also be employed for a facsimile transmission function, a printing function and the like. In addition, in the embodiment of the present disclosure, the operation unit 102 has been described with regard to a case of being employed in the multifunction peripheral 100; however, the operation apparatus can be applied to various image forming apparatuses including various image processing apparatuses and the like. The operation apparatus can also be applied to various image display apparatuses and the like. Advantageous effects similar to those mentioned above can also be achieved with these configurations.

In the present disclosure, a display control method for an operation apparatus is disclosed, the operation apparatus including a touch panel that can display a setting item window (initial window) displaying a plurality of setting item keys and a setting condition input window accepting input of a setting condition for a setting item corresponding to each of the plurality of setting item keys and detect an input operation to the plurality of setting item keys, the method including:

a determination step in which the operation unit determines whether an input operation (pressure) to the plurality of setting item keys is detected within a predetermined time period;

a shrinkage rate calculating step in which the operation unit calculates, in a case in which it is determined in the determination step that an input operation on the plurality of setting item keys is detected within a predetermined time period, a shrinkage rate allowing equal allocation of space for a predetermined number, which is smaller than the number of setting item keys, of setting condition input windows in the display region based on the number of setting items, which is the number of setting item keys on which the input operation is detected, and a size of a display region in a case of displaying only one setting condition input window on the touch panel;

a window shrinking step in which the operation apparatus shrinks a predetermined number of the setting condition input windows, which rank high in the order of acceptance of the input operation on the corresponding setting item keys, among the setting condition input windows accepting the input of a setting condition for the setting item corresponding to the setting item keys on which the input operation is detected, based on the shrinkage rate calculated in the shrinkage rate calculating step; and a multi window displaying step in which the operation unit displays the predetermined number of setting condition input windows that are shrunk in the window shrinking step in the display region, in an arrangement corresponding to the order.

Furthermore, in the embodiment of the present disclosure, although the operation unit 102 was configured with various units, a configuration may include provision of a storage medium that enables storage of a program for realizing the respective units in the storage medium. In such a configuration, the operation unit 102 or the multifunction peripheral 100 reads the programs, thereby realizing the respective units by the operation unit 102 or the multifunction peripheral 100. In this case, the program read from the recording medium itself provides the advantageous effect of the present disclosure. Alternatively, steps executed by the various units can be provided as methods stored in a hard disk.

The program is, for example, a computer-executable program for providing the display control method. In addition, the storage medium is a computer-readable storage medium that stores a program that causes a computer to execute the display control method.

The invention claimed is:

1. An operation apparatus comprising: a touch panel that can display a setting item window displaying a plurality of setting item keys and a setting condition input window accepting input of a setting condition for a setting item corresponding to each of the plurality of setting item keys and detect an input operation to the plurality of setting item keys;
   a determination unit that determines whether an input operation on the plurality of setting item keys is detected within a predetermined time period by the touch panel;
   a shrinkage rate calculating unit that calculates, in a case in which the determination unit determines that an input operation on the plurality of setting item keys is detected within a predetermined time period, a shrinkage rate allowing equal allocation of space for a predetermined number, which is at least a setting item number, which is the number of setting item keys on which the input operation is detected, of setting condition input windows in a display region based on the setting item number, and a size of the display region in a case of displaying only one setting condition input window on the touch panel;
   a window shrinking unit that shrinks a predetermined number of setting condition input windows among the setting condition input windows for accepting an input of a setting condition for the setting item corresponding to the setting item keys on which the input operation is detected, based on the shrinkage rate calculated by the shrinkage rate calculating unit; and
   a multi window display unit that displays in the display region the predetermined number of setting condition input windows that are shrunk by the window shrinking unit.

2. An operation apparatus comprising: a touch panel that can display a setting item window displaying a plurality of setting item keys and a setting condition input window accepting input of a setting condition for a setting item corresponding to each of the plurality of setting item keys and detect an input operation to the plurality of setting item keys;
   a determination unit that determines whether an input operation to the plurality of setting item keys is detected within a predetermined time period;
   a shrinkage rate calculating unit that calculates, in a case in which the determination unit determines that an input operation on the plurality of setting item keys is detected within a predetermined time period, a shrinkage rate allowing equal allocation of space for a predetermined number, which is at least a setting item number, which is the number of setting item keys on which the input operation is detected, of setting condition input windows in a display region based on the setting item number, and a size of the display region in a case of displaying only one setting condition input window on the touch panel;
   a window shrinking unit that shrinks a predetermined number of the setting condition input windows, which rank high in order of acceptance of the input operation on the corresponding setting item keys, among the setting condition input windows accepting the input of a setting condition for the setting item corresponding to the setting item keys on which the input operation is detected, based on the shrinkage rate calculated by the shrinkage rate calculating unit; and
   a multi window display unit that displays in the display region in an arrangement corresponding to the order, the predetermined number of setting condition input windows that are shrunk by the window reduction unit.

3. The operation apparatus according to claim 2, wherein the shrinkage rate calculating unit restricts the number of setting items used for calculating the shrinkage rate, based on any one of: a display limit defined in advance; the size of an image in the setting condition input window after shrinkage; and the font size of characters in the setting condition input window after the shrinkage.

4. The operation apparatus according to claim 2, wherein the shrinkage rate calculating unit: determines whether the number of setting items is at least the display limit defined in advance; calculates the shrinkage rate based on the display limit and the size of the display region if the number of setting items is at least the display limit; and calculates the shrinkage rate based on the number of setting items and the size of the display region if the number of setting items is smaller than the display limit.

5. The operation apparatus according to claim 2, wherein, in a state in which a plurality of shrunk setting condition input windows is displayed in the display region by the multi window display unit, in a case in which, among the setting item keys for which the input operation is detected, there is a remaining setting item key for which setting condition input of the setting item is not completed when an input of the setting condition to a predetermined setting item is completed via the shrunk setting condition input windows by way of the touch panel, the multi window display unit causes the shrinkage rate calculating unit to newly calculate the shrinkage rate based on the number of the remaining setting item keys.

6. The operation apparatus according to claim 5, wherein the window shrinking unit: in a case in which a new shrinkage rate has been calculated by the shrinkage rate calculating unit, determines whether the new shrinkage rate is equal to the previous shrinkage rate; shrinks the setting condition input window corresponding to the setting item key based on the previous shrinkage rate in a case in which the new shrinkage rate is equal to the previous shrinkage rate; and shrinks the setting condition input window corresponding to the setting item key based on the new shrinkage rate in a case in which the new shrinkage rate is not equal to the previous shrinkage rate.

7. The operation apparatus according to claim 6, wherein, when the shrunk setting condition input window is to be displayed in which an unopened setting condition input window, which is the setting condition input window for the setting item of which setting condition input window has not been displayed, among the items corresponding to the detected setting item keys, is shrunk, the multi window display unit: clears the shrunk setting condition input window to which the setting condition is already input via the touch panel; slides the shrunk setting condition input window displayed on the display region, to which the setting condition is not input, to a first side of the display region; and slides the shrunk input window not displayed on the display region, in which unopened setting condition input window is shrunk, from a second side to the first side of the display region.

8. An image forming apparatus comprising an operation apparatus including: a touch panel that can display a setting item window displaying a plurality of setting item keys and a setting condition input window accepting input of a setting condition for a setting item corresponding to each of the plurality of setting item keys and detect an input operation to the plurality of setting item keys;
a determination unit that determines whether an input operation to the plurality of setting item keys is detected within a predetermined time period;
a shrinkage rate calculating unit that calculates, in a case in which the determination unit determines that an input operation on the plurality of setting item keys is detected within a predetermined time period, a shrinkage rate allowing equal allocation of space for a predetermined number, which is smaller than a setting item number, which is the number of setting item keys on which the input operation is detected, of setting condition input windows in a display region based on the setting item number, and a size of the display region in a case of displaying only one setting condition input window on the touch panel;
a window shrinking unit that shrinks a predetermined number of the setting condition input windows, which rank high in order of acceptance of the input operation on the corresponding setting item keys, among the setting condition input windows accepting the input of a setting condition for the setting item corresponding to the setting item keys on which the input operation is detected, based on the shrinkage rate calculated by the shrinkage rate calculating unit; and
a multi window display unit that displays in the display region in an arrangement corresponding to the order, the predetermined number of setting condition input windows that are shrunk by the window shrinking unit.

9. The image forming apparatus according to claim 8, wherein, in the operation apparatus, the shrinkage rate calculating unit restricts the number of setting items used for calculating the shrinkage rate, based on any one of: a display limit defined in advance; the size of an image in the setting condition input window after shrinkage; and the font size of characters in the setting condition input window after the shrinkage.

10. The image forming apparatus according to claim 8, wherein, in the operation apparatus, the shrinkage rate calculating unit: determines whether the number of setting items is at least the display limit defined in advance; calculates the shrinkage rate based on the display limit and the size of the display region if the number of setting items is at least the display limit; and calculates the shrinkage rate based on the number of setting items and the size of the display region if the number of setting items is smaller than the display limit.

11. The image forming apparatus according to claim 8, wherein, in the operation apparatus, in a state in which a plurality of shrunk setting condition input windows is displayed in the display region by the multi window display unit, in a case in which, among the setting item keys for which the input operation is detected, there is a remaining setting item key for which setting condition input of the setting item is not completed when an input of the setting condition to a predetermined setting item is completed via the shrunk setting condition input windows by way of the touch panel, the multi window display unit causes the shrinkage rate calculating unit to newly calculate the shrinkage rate based on the number of the remaining setting item keys.

12. The image forming apparatus according to claim 11, wherein, in the operation apparatus, the window shrinking unit: in a case in which a new shrinkage rate has been calculated by the shrinkage rate calculating unit, determines whether the new shrinkage rate is equal to the previous shrinkage rate; shrinks the setting condition input window corresponding to the setting item key based on the previous shrinkage rate in a case in which the new shrinkage rate is equal to the previous shrinkage rate; and shrinks the setting condition input window corresponding to the setting item key based on the new shrinkage rate in a case in which the new shrinkage rate is not equal to the previous shrinkage rate.

13. The image forming apparatus according to claim 12, wherein, in the operation apparatus, when the shrunk setting condition input window is to be displayed in which an unopened setting condition input window, which is the setting condition input window for the setting item of which setting condition input window has not been displayed, among the items corresponding to the detected setting item keys, is shrunk, the multi window display unit: clears the shrunk setting condition input window to which the setting condition is already input via the touch panel; slides the shrunk setting condition input window displayed on the display region, to which the setting condition is not input, to a first side of the display region; and slides the shrunk input window not displayed on the display region, in which unopened setting condition input window is shrunk, from a second side to the first side of the display region.

14. A display control method for an operation apparatus including a touch panel that can display a setting item window displaying a plurality of setting item keys and a setting condition input window accepting input of a setting condition for a setting item corresponding to each of the plurality of setting item keys and detect an input operation to the plurality of setting item keys, the method comprising:
- a determination step in which the operation apparatus determines whether an input operation to the plurality of setting item keys is detected within a predetermined time period;
- a shrinkage rate calculating step in which the operation apparatus calculates, in a case in which it is determined in the determination step that an input operation on the plurality of setting item keys is detected within a predetermined time period, a shrinkage rate allowing equal allocation of space for a predetermined number, which is smaller than the number of setting item keys, of setting condition input windows in the display region based on the number of setting items, which is the number of setting item keys on which the input operation is detected, and a size of a display region in a case of displaying only one setting condition input window on the touch panel;
- a window shrinking step in which the operation apparatus shrinks a predetermined number of the setting condition input windows, which rank high in order of acceptance of the input operation on the corresponding setting item keys, among the setting condition input windows accepting the input of a setting condition for the setting item corresponding to the setting item keys on which the input operation is detected, based on the shrinkage rate calculated in the shrinkage rate calculating step; and
- a multi window displaying step in which the operation unit displays in the display region in an arrangement corresponding to the order, the predetermined number of setting condition input windows that are shrunk in the window shrinking step.

15. A non-transitory storage medium that stores a program that causes a computer to execute the display control method according to claim 14, wherein the storage medium is computer-readable.

* * * * *